United States Patent
Yone et al.

(10) Patent No.: US 11,439,907 B2
(45) Date of Patent: Sep. 13, 2022

(54) AUDIO FEEDBACK THAT VARIES BASED ON DIRECTION OF INPUT STROKE

(71) Applicant: NINTENDO CO., LTD., Kyoto (JP)

(72) Inventors: Masami Yone, Kyoto (JP); Yuichi Ozaki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 186 days.

(21) Appl. No.: 16/899,889

(22) Filed: Jun. 12, 2020

(65) Prior Publication Data
US 2020/0391112 A1 Dec. 17, 2020

(30) Foreign Application Priority Data

Jun. 14, 2019 (JP) .............................. JP2019-111003

(51) Int. Cl.
*G06F 3/041* (2006.01)
*G06F 3/033* (2013.01)
(Continued)

(52) U.S. Cl.
CPC .......... *A63F 13/54* (2014.09); *A63F 13/2145* (2014.09); *G06F 3/041* (2013.01);
(Continued)

(58) Field of Classification Search
CPC ...... G06F 3/0383; G06F 3/041; G06F 3/0436; G06F 3/04883
See application file for complete search history.

(56) References Cited

U.S. PATENT DOCUMENTS

2011/0102349 A1 5/2011 Harris
2014/0043242 A1* 2/2014 Dietz ...................... G06F 3/016
345/173
(Continued)

FOREIGN PATENT DOCUMENTS

| JP | 2003-296010 A | 10/2003 |
| JP | 2011-527792 A | 11/2011 |
| JP | 2014-222492 A | 11/2014 |

OTHER PUBLICATIONS

Notice of Reasons for Refusal dated Sep. 7, 2021 received in Japanese Patent Application No. JP 2019-111003 together with an English language translation.
(Continued)

*Primary Examiner* — Lawrence S Galka
(74) *Attorney, Agent, or Firm* — Scully, Scott, Murphy & Presser, P.C.

(57) ABSTRACT

A storage medium storing therein a program, an information processing apparatus, an information processing method, a game system and a mobile device are disclosed. For example, disclosed is a non-transitory storage medium storing therein a program that is readable by a computer of an information processing apparatus, the program being configured to cause the computer to: acquire input coordinates of input performed based on an operation performed by a user; generate drawing information for displaying a path corresponding to the input coordinates on a display apparatus; determine a movement direction of the input based on a change in the input coordinates, which are acquired continuously while the input is performed; generate sound information of a virtual writing sound that is changed based on the movement direction in response to the input coordinates changing; and output the sound information of the virtual writing sound to a speaker.

26 Claims, 18 Drawing Sheets

(51) Int. Cl.
*A63F 13/54* (2014.01)
*G06F 3/16* (2006.01)
*G06T 11/20* (2006.01)
*G06F 3/04883* (2022.01)
*A63F 13/2145* (2014.01)
*A63F 13/24* (2014.01)
*G09B 19/02* (2006.01)

(52) U.S. Cl.
CPC .......... *G06F 3/04883* (2013.01); *G06F 3/165* (2013.01); *G06T 11/203* (2013.01); *A63F 13/24* (2014.09); *A63F 2300/1043* (2013.01); *A63F 2300/1075* (2013.01); *A63F 2300/6081* (2013.01); *G09B 19/025* (2013.01)

(56) References Cited

U.S. PATENT DOCUMENTS

| | | | | |
|---|---|---|---|---|
| 2014/0104207 | A1* | 4/2014 | Park | G06F 3/016 345/173 |
| 2014/0253478 | A1* | 9/2014 | Jeong | G06F 3/041 345/173 |
| 2014/0340326 | A1* | 11/2014 | Kameyama | G06F 3/03545 345/173 |
| 2014/0340328 | A1* | 11/2014 | Kameyama | G06F 3/03545 345/173 |
| 2016/0044422 | A1* | 2/2016 | Aurongzeb | G06F 3/038 345/179 |
| 2018/0129289 | A1 | 5/2018 | Harris | |

OTHER PUBLICATIONS

Decision of Refusal dated Mar. 29, 2022 received in Japanese Patent Application No. JP 2019-111003 together with an English language translation.

* cited by examiner

F I G. 2
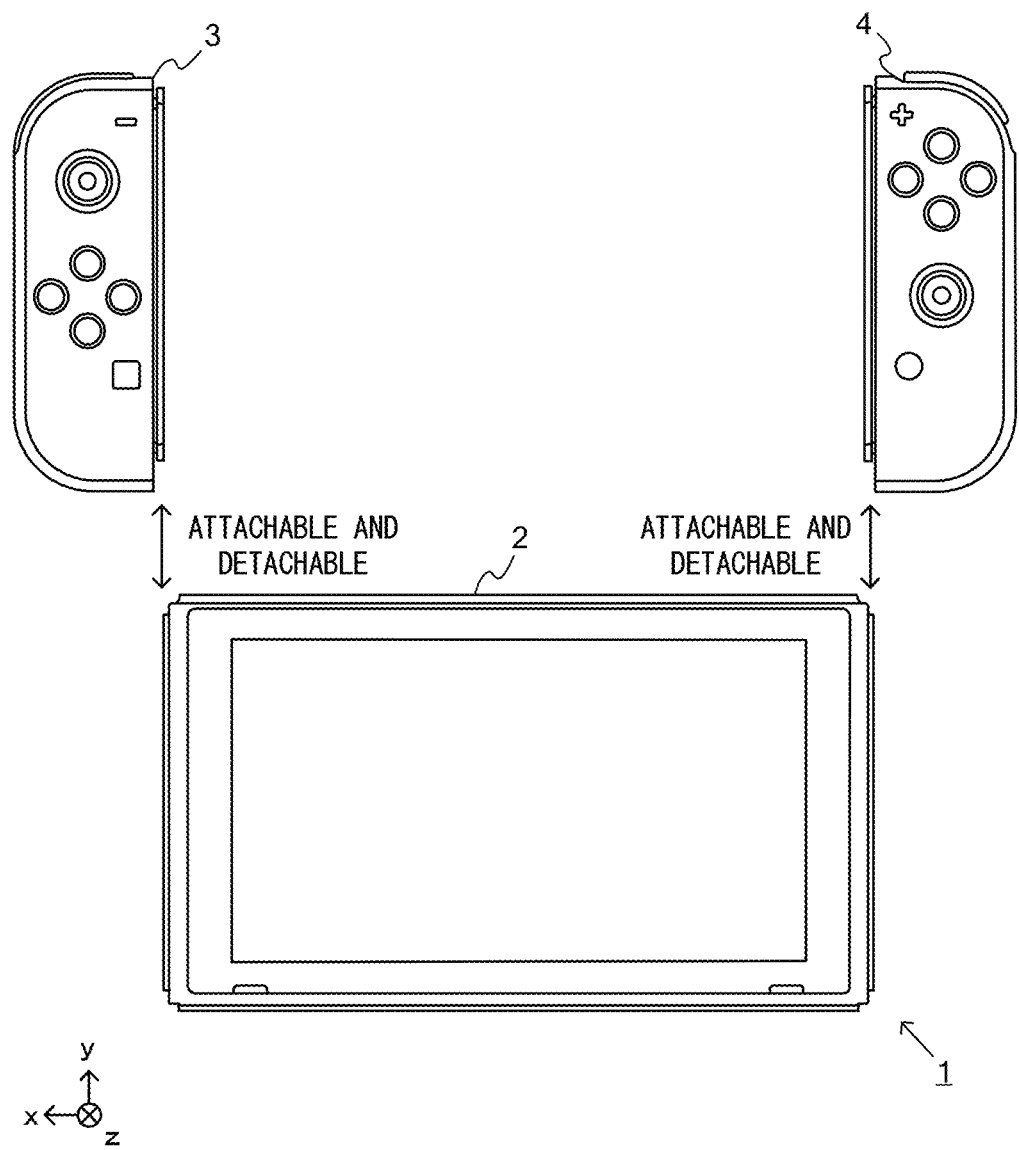

AUDIO FEEDBACK THAT VARIES BASED ON DIRECTION OF INPUT STROKE

CROSS REFERENCE TO RELATED APPLICATION

This application claims priority from Japanese Patent Application No. 2019-111003 filed on Jun. 14, 2019, the content of which is incorporated herein by reference in its entirety.

TECHNICAL FIELD

The present invention relates to a storage medium, an information processing apparatus, an information processing method, and a game system.

BACKGROUND ART

JP 2011-527792A discloses that a virtual writing sound is output when input is performed on a touch panel using a touch pen. It is also disclosed that this virtual writing sound is changed according to the speed of input.

JP 2011-527792A is an example of related art.

SUMMARY I/F THE INVENTION

In JP 2011-527792A described above, the virtual writing sound is changed according to the speed of input, but an actual writing sound does not result from only the speed of writing. Accordingly, there has been desire for a virtual writing sound that can improve the feeling that actual writing is being performed. The present invention was achieved in order to solve this problem, and aims to provide an information processing program, an information processing apparatus, an information processing method, and a game system that can improve the feeling that actual writing is being performed when input of a character or the like is performed.

A storage medium according to the present disclosure is a non-transitory storage medium storing therein a program that is readable by a computer of an information processing apparatus, the program being configured to cause the computer to: acquire input coordinates of input performed based on an operation performed by a user; generate drawing information for displaying a path corresponding to the input coordinates on a display apparatus; determine a movement direction of the input based on a change in the input coordinates, which are acquired continuously while the input is performed; generate sound information of a virtual writing sound that is changed based on the movement direction in response to the input coordinates changing, and output the sound information of the virtual writing sound to a speaker.

According to this configuration, when a path of input is displayed on a display apparatus according to an operation performed by a user, that is, for example, when a character or the like is displayed on a display apparatus by imitating writing, a changed virtual writing sound is generated as sound information based on the movement direction of the input. For example, when the user writes a character or the like on paper or the like using a writing tool, the writing sound is not constant, but changes according to the movement direction of the writing tool. In the present invention, sound information that imitates a sound that changes according to the direction of writing can be generated, and therefore when a user performs an input operation, it is possible to improve the feeling of actually writing.

In the above-described storage medium, sound information of the changed virtual writing sound can be generated in the following various modes.

In the above-described storage medium, the program can be further configured to cause the computer to generate the sound information where a volume of the virtual writing sound is changed according to the movement direction.

In the above-described storage medium, the program can be further configured to cause the computer to generate the sound information where when the movement direction is close to being perpendicular to a first direction, the volume is greater compared to a case where the movement direction is close to being parallel to the first direction.

In the above-described storage medium, the program can be further configured to cause the computer to generate the sound information where a pitch of the virtual writing sound is changed according to the movement direction.

In the above-described storage medium, the program can be further configured to cause the computer to generate the sound information where when the movement direction is close to being perpendicular to a first direction, the pitch is higher compared to a case where the movement direction is close to being parallel to the first direction.

In the above-described storage medium, the program can be further configured to cause the computer to generate the sound information where a tone of the virtual writing sound is changed according to the movement direction.

In the above-described storage medium, the program can be further configured to cause the computer to change the tone depending on whether the angle formed by the movement direction with respect to a first direction is greater than or equal to 0 degrees and less than 180 degrees or greater than or equal to 180 degrees and less than 360 degrees.

In the above-described storage medium, the input coordinates can be set in a coordinate plane of an orthogonal coordinate system, and the first direction can be a direction that is inclined approximately 45 degrees from a coordinate axis of the coordinate plane.

In the above-described storage medium, the first direction can be a direction that is inclined approximately 45 degrees with respect to the coordinate axis.

In the above-described processing program, the first direction can be changed depending on whether the user is set as being right-handed or is set as being left-handed.

In the above-described storage medium, the program can be further configured to cause the computer to determine an input velocity based on a change in the input coordinates and change the sound information of the virtual writing sound according to the determined input velocity.

In the above-described storage medium, the program can be further configured to cause the computer to generate the sound information where the change in the sound information of the virtual writing sound is greater when the determined input velocity is faster.

In the above-described storage medium, the program can be further configured to cause the computer to generate the sound information of the virtual writing sound where virtual writing sound has a higher pitch when the determined input velocity is faster.

In the above-described storage medium, the program can be further configured to cause the computer to generate the sound information of the virtual writing sound, which includes a base sound that does not change according to the movement direction.

According to this configuration, the following effects can be obtained. For example, when sound information of a virtual writing sound that has been changed based on the movement direction of input is generated, there is a risk that, depending on the movement direction, the volume of the virtual writing sound will decrease even though input is continued, and it will feel strange to the user. In view of this, if a base sound that does not change according to the movement direction is included in the virtual writing sound, the base sound is output regardless of the movement direction, and therefore it is possible to prevent the volume of the virtual writing sound from decreasing due to the movement direction, and the feeling of strangeness can be prevented.

In the above-described storage medium, the display apparatus can be a touch display on which the input is to be performed.

An input processing apparatus according to the present disclosure is an information processing apparatus including: at least one processor; at least one storage medium; a program stored in the storage medium; wherein the program is configured to causes the at least one processor to: acquire input coordinates of input performed based on an operation performed by a user; generate drawing information for displaying a path corresponding to the input coordinates on a display apparatus; determine a movement direction of the input based on a change in the input coordinates, which are acquired continuously while the input is performed; generate sound information of a virtual writing sound that is changed based on the movement direction in response to the input coordinates changing, and output the sound information of the virtual writing sound to a speaker.

An input processing method according to the present disclosure is an information processing method including: acquiring input coordinates of input performed based on an operation of a user; generating drawing information for displaying a path corresponding to the input coordinates on a display apparatus; determining a movement direction of the input based on a change in the input coordinates, which are acquired continuously while the input is performed; generating sound information of a virtual writing sound that is changed based on the movement direction in response to the input coordinates changing, and outputting the sound information of the virtual writing sound to a speaker.

A game system according to the present disclosure is a game system including: at least one processor; at least one storage medium; a program stored in the storage medium; wherein the program is configured to causes the at least one processor to: acquire input coordinates of input performed based on an operation performed by a user; generate drawing information for displaying a path corresponding to the input coordinates on a display apparatus; determine a movement direction of the input based on a change in the input coordinates, which are acquired continuously while the input is performed; generate sound information of a virtual writing sound that is changed based on the movement direction in response to the input coordinates changing, and output the sound information of the virtual writing sound to a speaker.

A mobile device according to the present disclosure is a mobile device including: a display comprising a touch panel; at least one speaker; and a processor. The processor is configured to acquire input coordinates of input performed on the touch panel, generate drawing information for displaying a path corresponding to the input coordinates in the display, determine a movement direction of the input based on a change in the input coordinates, which are acquired continuously while the input is performed, generate sound information of a virtual writing sound that is changed based on the movement direction in response to the input coordinates changing and output the sound information of the virtual writing sound to the at least one speaker.

The mobile device may be a game controller.

The processor is configured to generate a first audio data and a third audio data and combine the first audio data and the third audio data to generate the sound information of the virtual writing sound when the determined direction is a first direction. The processor is configured to generate a second audio data and the third audio data and combine the second audio data and the third audio data to generate the sound information of the virtual writing sound when the determined direction is a second direction. The first audio data and the second audio data are different.

According to the above-described storage medium, information processing apparatus, information processing method, game system and mobile device, it is possible to improve the feeling that writing is actually being performed when performing input of a character or the like.

BRIEF DESCRIPTION I/F THE DRAWINGS

FIG. 2 is a diagram showing an example of a game system in a state in which the left controller and the right controller have been removed from the main body apparatus.

EMBODIMENTS OF THE INVENTION

Hereinafter, an embodiment in which an information processing apparatus according to the present invention is applied to a game system will be described.

1. Hardware Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

1-1. Main Body Apparatus

Figure 1:
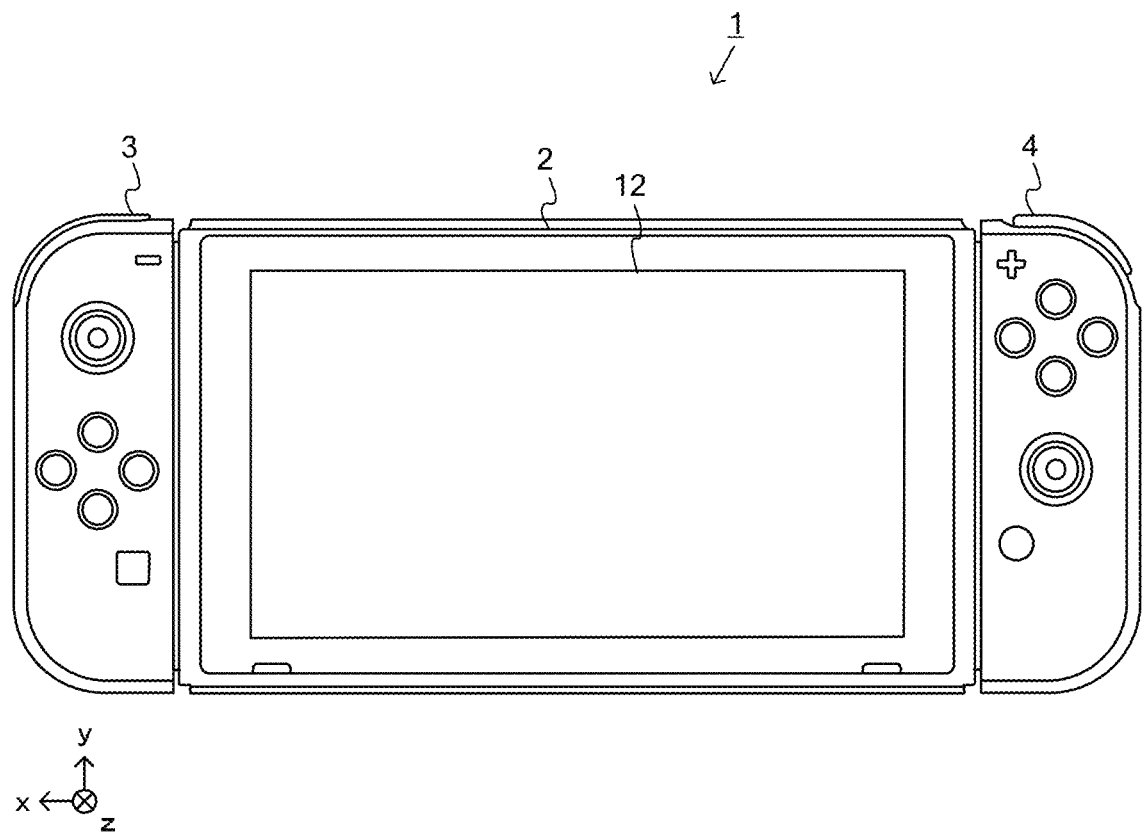
FIG. 1 is a diagram showing an example of a game system in a state in which a left controller and a right controller are mounted on a main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display (display apparatus) 12. Each of the left controller 3 and the right controller 4 is an apparatus including operation sections with which a user provides inputs.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
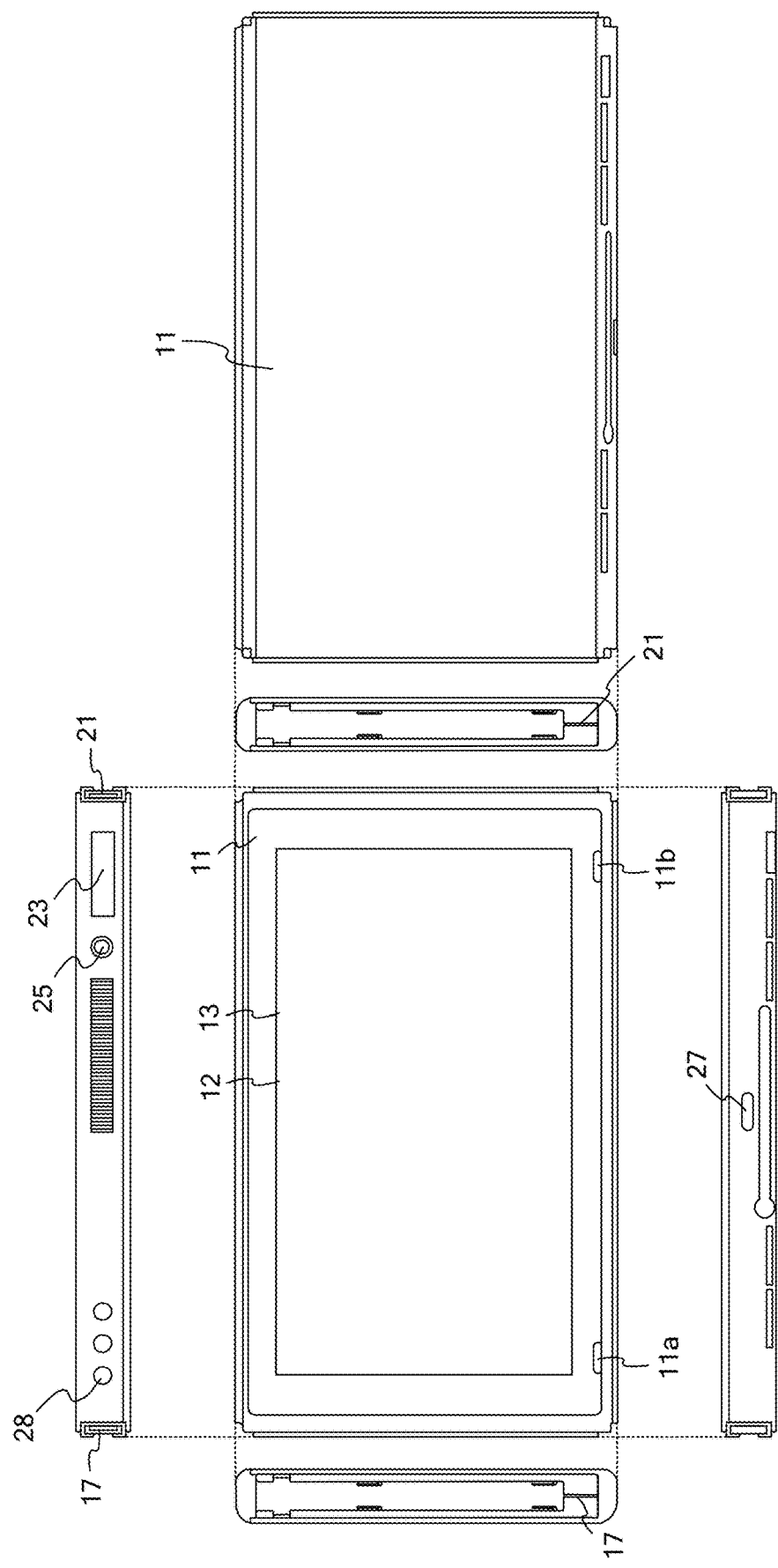
FIG. 3 is a six-surface diagram showing an example of the main body apparatus of FIG. 1.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type). Further, input to the touch panel 13 can be performed by, for example, touching with a user's finger, or using a known touch pen. The pen tip of the touch pen is made of a conductive material and can detect the path of the pen tip on the touch panel 13. Note that hereinafter, the display 12 and the touch panel 13 will be collectively referred to as a touch display.

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

1-2. Left Controller

Figure 4:
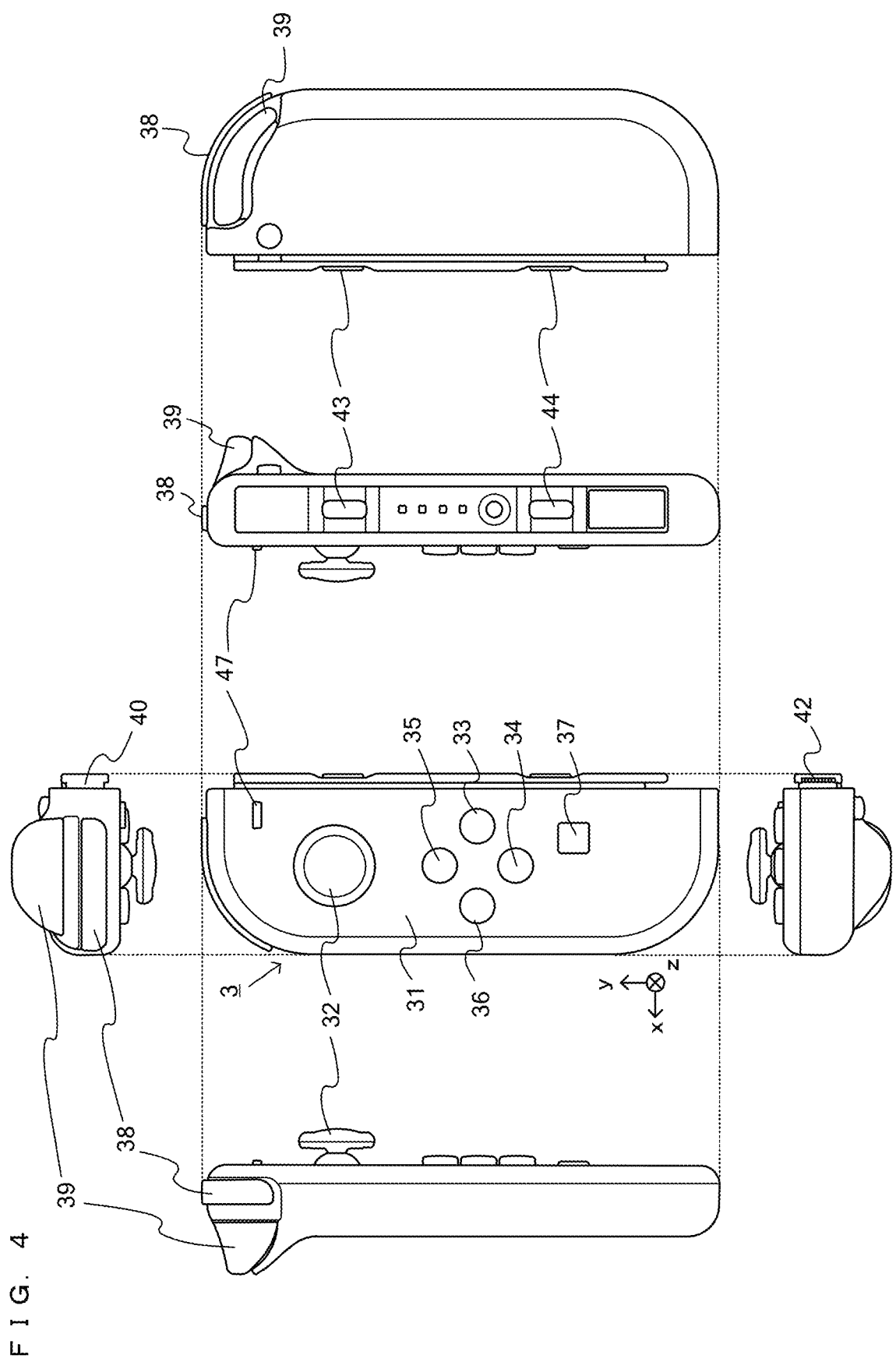
FIG. 4 is a six-surface diagram showing an example of the left controller of FIG. 1.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

1-3. Right Controller

Figure 5:
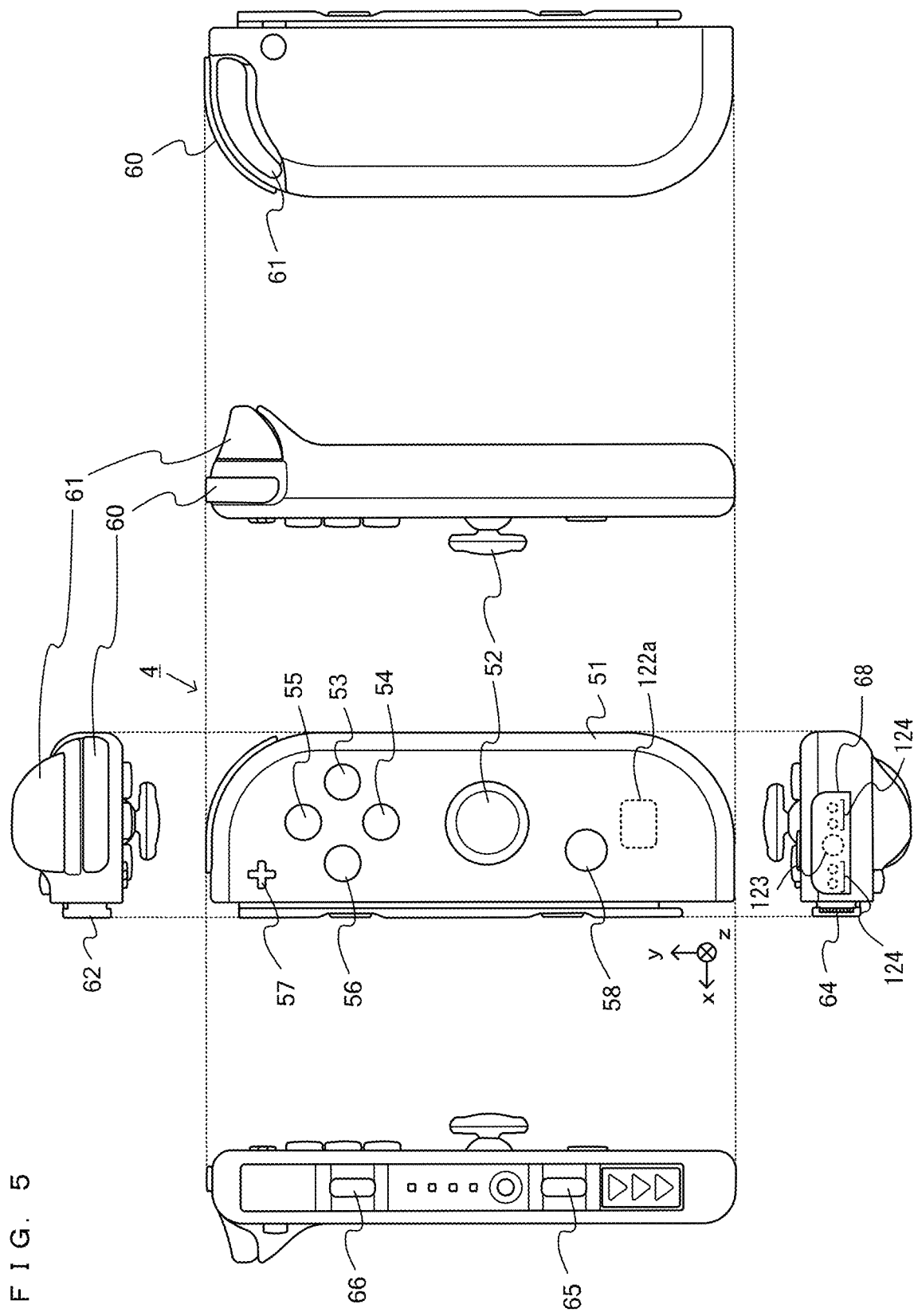
FIG. 5 is a six-surface diagram showing an example of the right controller of FIG. 1.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, a window portion 68 is provided on a lower side surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

1-4. Internal Configuration of Main Body Apparatus

Figure 6:
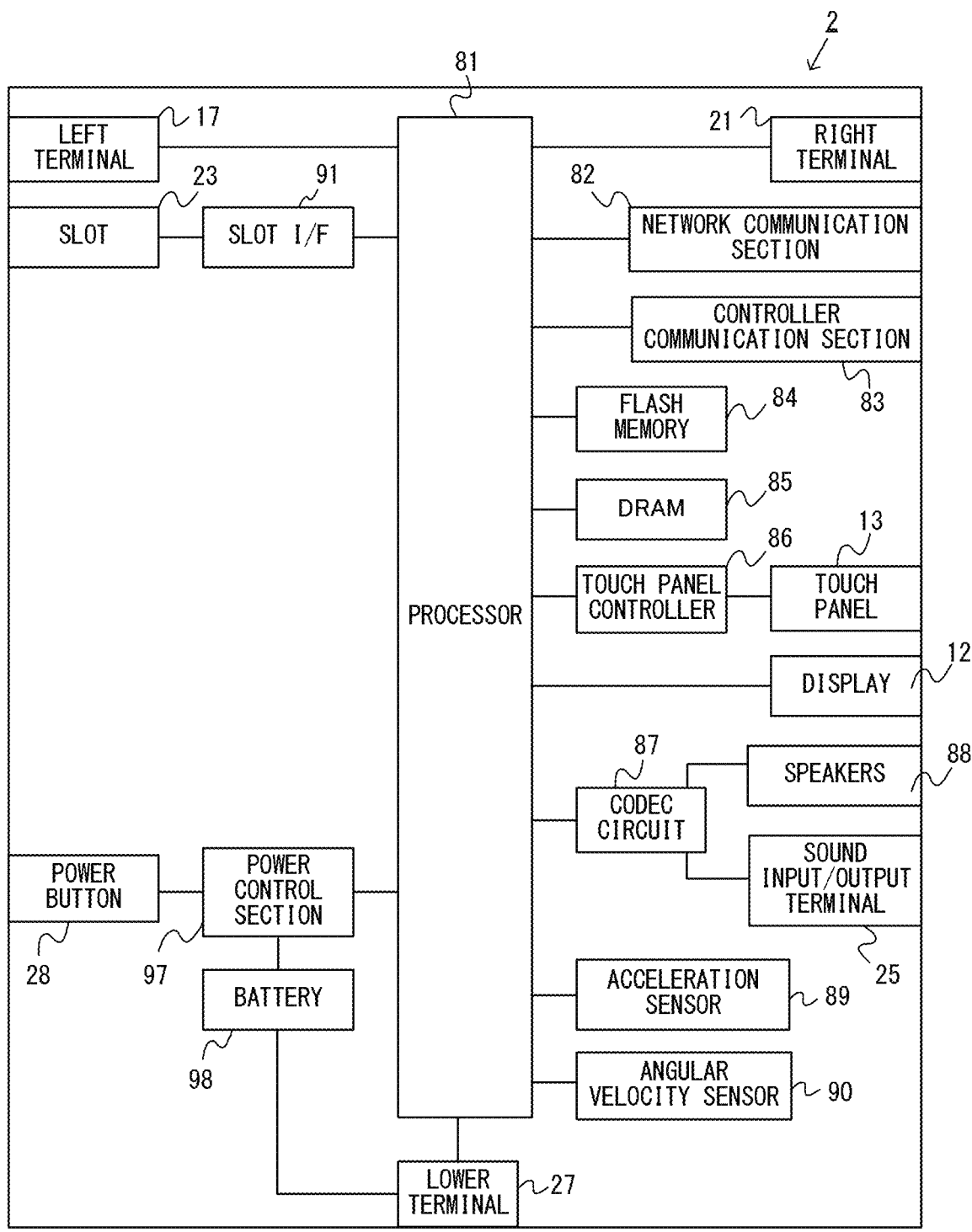
FIG. 6 is a block diagram showing an example of an internal configuration of the main body apparatus of FIG. 1.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

1-5. Internal Configuration of Controller

Figure 7:
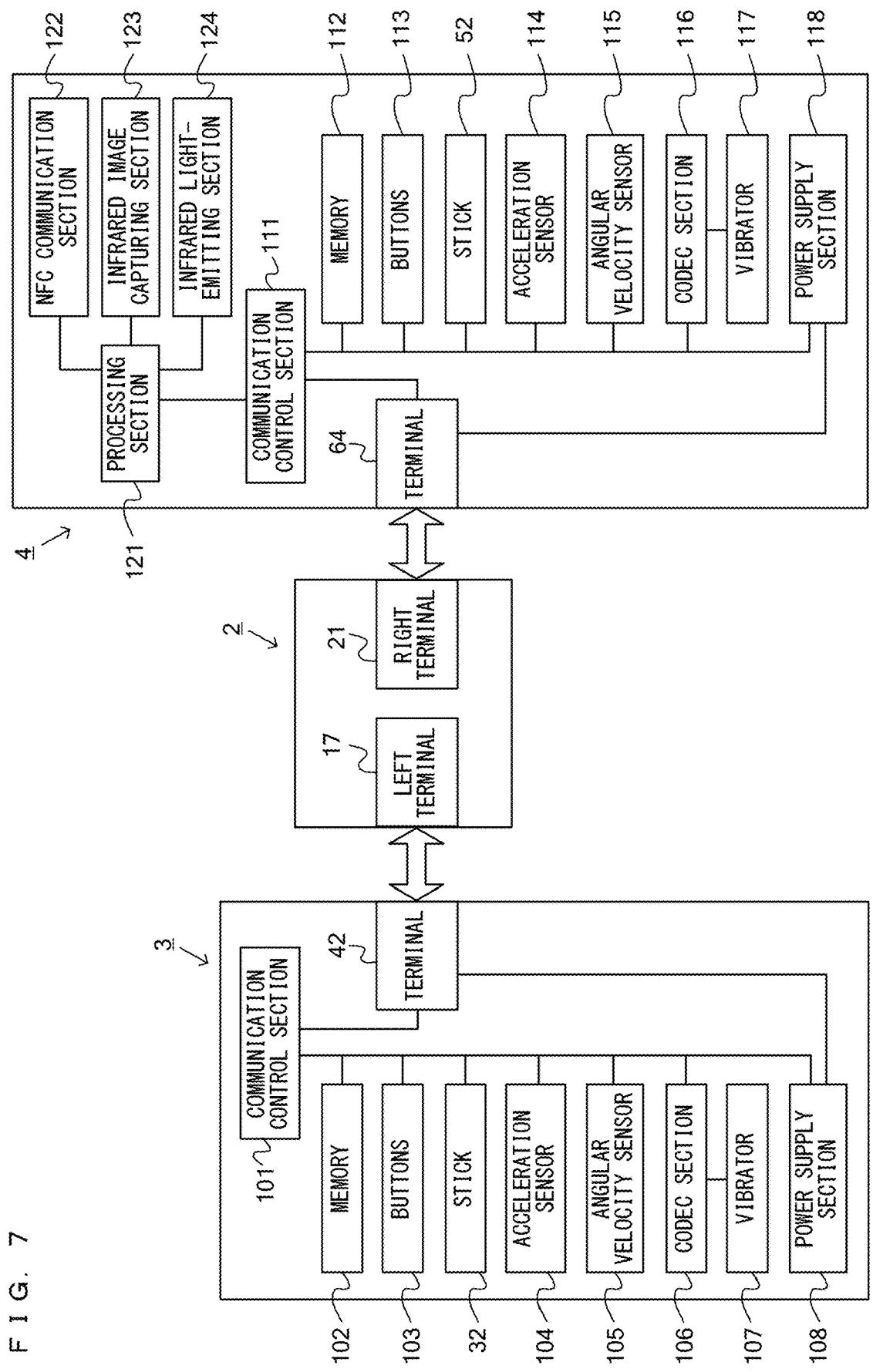
FIG. 7 is a block diagram showing an example of internal configurations of the main body apparatus, the left controller, and the right controller of FIG. 1.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122*a*). The other device can operate by the developed electromotive force, and may or may not have a power supply. When the right controller 4 (the antenna 122*a*) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

2. Overview of Game

Figure 8:
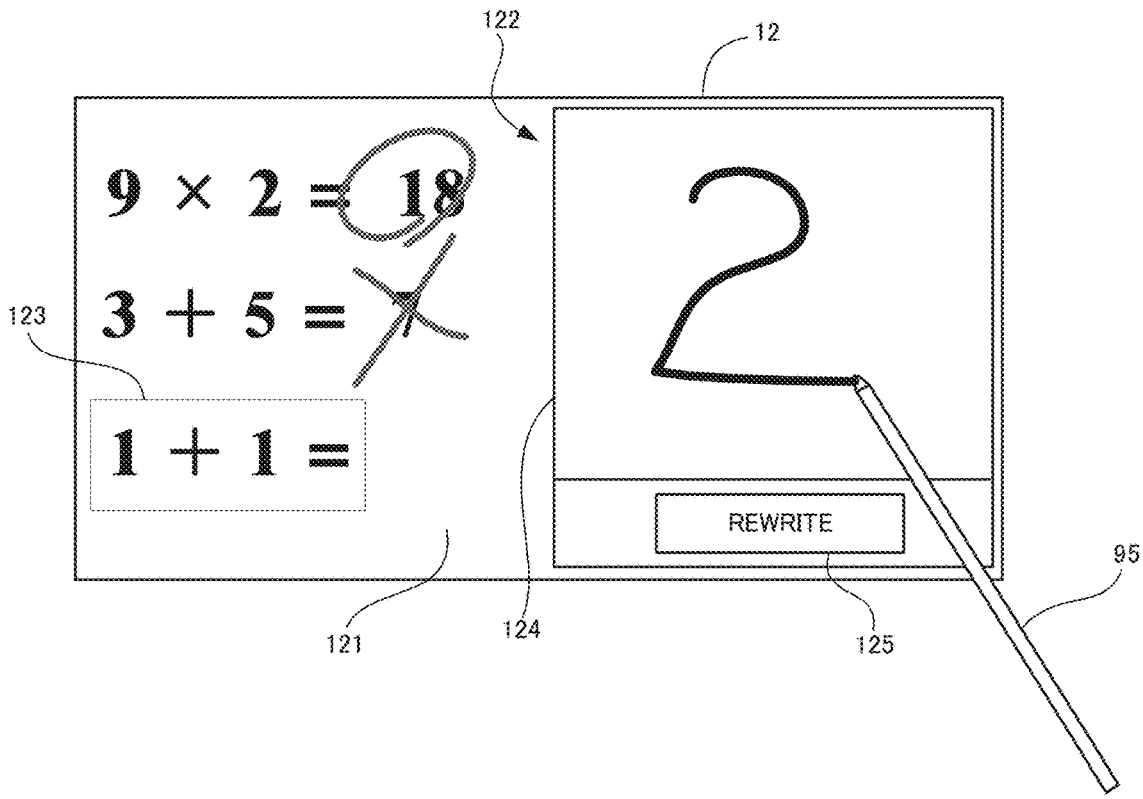
FIG. 8 is a screen of a game displayed on a display.
Figure 9:
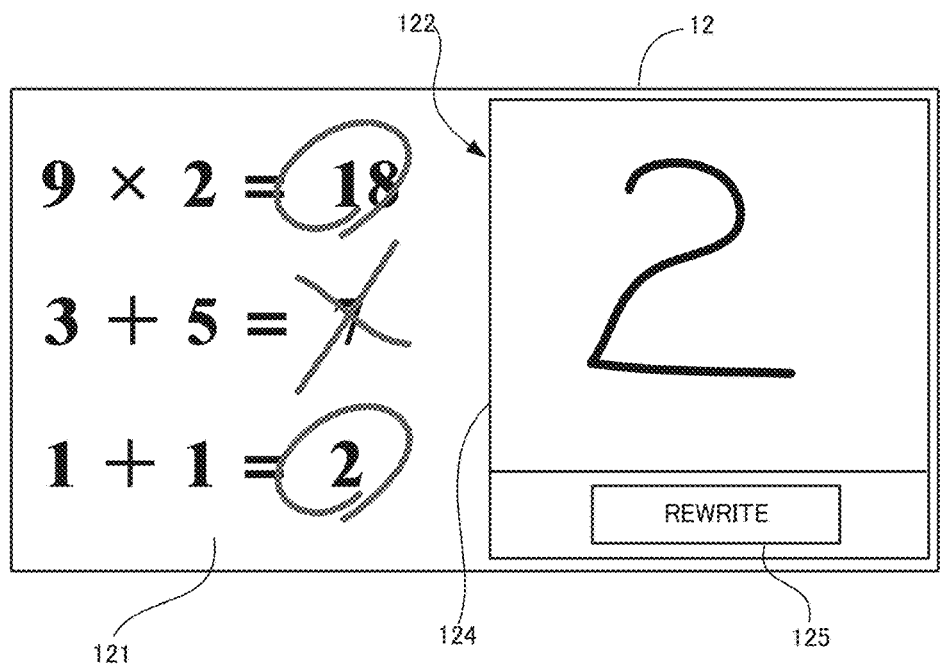
FIG. 9 is a screen of a game displayed on a display.

Next, an overview of a game that is performed in the game system of the present embodiment will be described with reference to FIGS. 8 and 9.

In this game system, the user uses the above-described touch pen to write a solution to an arithmetic problem displayed on the touch display 12. As one example, when the game is started, a problem region 121 in which an arithmetic problem is displayed and a solution region 122 in which the answer to the arithmetic problem is to be input are displayed on the display 12 as shown in FIG. 8. In the problem region 121, multiple arithmetic problems are displayed (three problems in the example shown in FIG. 8), and it is displayed whether or not the solutions to the first problem and the second problem, which have already been solved, are correct. That is, the solution to the first problem (9×2) is correct, and therefore the solution "18" is circled. The solution to the second problem (3+5) is incorrect, and therefore the solution "7" is crossed out. A frame 123 is displayed around the third problem, which is to be solved next. That is, the problem that is to be solved is emphasized for the user.

In the solution region 122, a rectangular input space 124 for inputting a character is displayed, and a rewrite button 125 for rewriting an input character is displayed below the input space 124. The solution to the problem to be solved is input in the input space 124 using the touch pen 95. In the example shown in FIG. 8, the user is being prompted to solve the third problem (1+1), and the user is inputting the solution "2" using the touch pen 95. If the user wishes to perform correction before finishing input, the user touches the rewrite button 125, whereupon the character that was input to the input space 124 is entirely erased, and a character and the like can be newly input. Also, a virtual writing sound is output from the speakers 88 while input is performed using the touch pen 95. A virtual writing sound is, for example, a sound that imitates the sound produced by pencil lead and paper rubbing against each other when a character is written on paper using a pencil. This will be described later.

Also, after input ends, that is, when a predetermined amount of time elapses from when input using the touch pen 95 ends and the pen tip of the touch pen 95 is removed from the touch panel 13, the input character is displayed as the solution to the third problem in the problem region 121 and whether or not the solution is correct is displayed. That is, as shown in FIG. 9, in the problem region 121, the input number "2" is displayed as the solution to the third problem, and whether or not the solution is correct is also displayed. In this example, the correct solution was input, and therefore the solution is circled.

Thus, when the three arithmetic problems end, the next problem is displayed on the display 12, and the user can continue solving the problem. Then, display of the problems and solutions are repeated until a predetermined number of problems have been solved. Note that when the user wishes to end the game, the user need only touch a predetermined end button (not shown).

3. Functional Configuration of Game System

Figure 10:
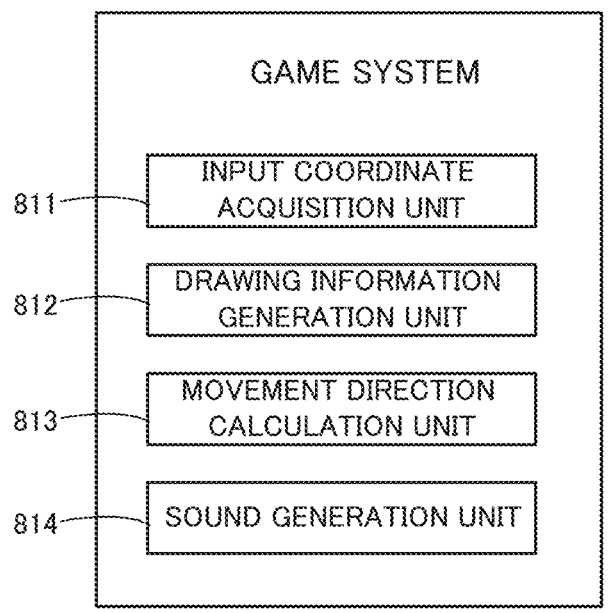
FIG. 10 is an example of a functional configuration of a game system according to an embodiment of the present invention.

Next, the functional configuration (software configuration) of the game system configured as described above will be described. FIG. 10 is an example of a functional configuration of a game system according to the present embodiment. The processor 81 of the game system loads a game program (information processing program) stored in the flash memory 84 or an external storage medium that is mounted in the slot 23 to the DRAM 85. Then, the processor controls the functional constituent elements by interpreting and executing the game program that was loaded to the DRAM 85. Accordingly, as shown in FIG. 10, the game system according to the present embodiment functions as a computer including an input coordinate acquisition unit 811, a drawing information generation unit 812, a movement direction calculation unit 813, and a sound generation unit 814.

An orthogonal coordinate system is set on the display 12 and the touch panel 13, and the input coordinate acquisition unit 811 stores the positions touched by the pen tip of the touch pen 95 on the touch panel 13 as input coordinates in the DRAM 85. When a character or the like is input using a touch pen, the input coordinates are recorded in accordance with the continuous movement of the pen tip, for example, at a period of 1/60 of a second. Accordingly, the path of the pen tip of the touch pen 95 from the time when the pen tip came into contact with the touch panel 13 to the time when the pen tip was removed from the touch panel 13 is stored in the DRAM 85 as input coordinates arranged in a time series.

Figure 11:
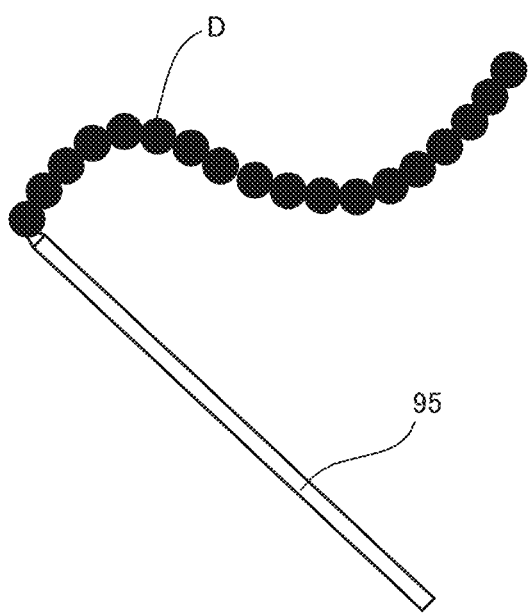
FIG. 11 is a diagram showing an example of drawing using a touch pen.

The drawing information generation unit 812 plays a function of displaying the above-described path of the pen tip on the display 12. That is, a dot with a predetermined diameter is displayed at the same time as the acquisition of the input coordinates acquired by the input coordinate acquisition unit 811 at a position corresponding to the input coordinates, that is, at a position corresponding to the pen tip, on the display 12. Then, as shown in FIG. 11, the drawing information generation unit 812 displays the path of the pen tip on the display 12 by displaying the dots D at positions corresponding to the input coordinates acquired sequentially accompanying the movement of the pen tip, whereby the dots D that are aligned in a time series are displayed as a line. In other words, the writing performed using the touch pen 85 is displayed virtually on the display 12. Note that for the sake of convenience in the description, the dots D are shown with emphasis in FIG. 11, but in actuality, a smooth line is displayed on the display 12.

Figure 12:
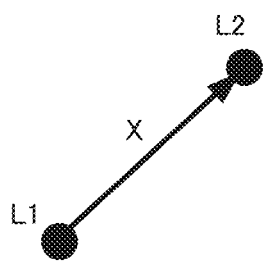
FIG. 12 is a diagram for illustrating an example of a movement direction of input during drawing using a touch pen.
Figure 13:
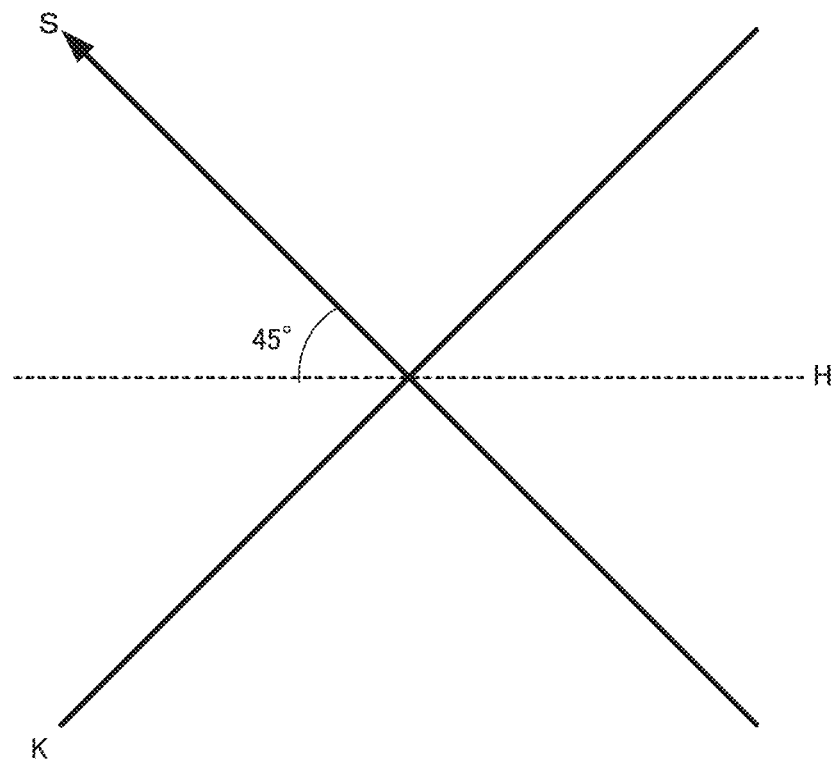
FIG. 13 is a diagram for illustrating an example of an orthogonal coordinate system set on a display and a touch panel in an embodiment of the present invention.

The movement direction calculation unit 813 performs a function of calculating the movement direction of the pen tip based on the input coordinates acquired by the input coordinate acquisition unit 811. The movement direction can be calculated using various methods, but for example, as shown in FIG. 12, for two input coordinates that are adjacent in the time series, that is, a first input coordinate L1 and a second input coordinate L2, a direction moving from the first input coordinate L1 to the second input coordinate L2 can be set as the movement direction X. Also, in the present embodiment, a right-handed user is envisioned, and as shown in FIG. 13, the angle of the movement direction X of the pen tip with respect to a reference line S is calculated, the reference line S being a line that is inclined at a 45 degree angle with respect to a horizontal line H, from the bottom right to the top left of the display 12. That is, when a right-handed user grips the pen during writing, the orientation of the pen in a plan view is roughly parallel to the reference line S, and therefore the direction in which the pen extends is the slope of the reference line S. Note that the horizontal line H is a line that extends in the left-right direction of the display 12. Also, a line that is perpendicular to the reference line S is called "intersecting line K".

Figure 14:
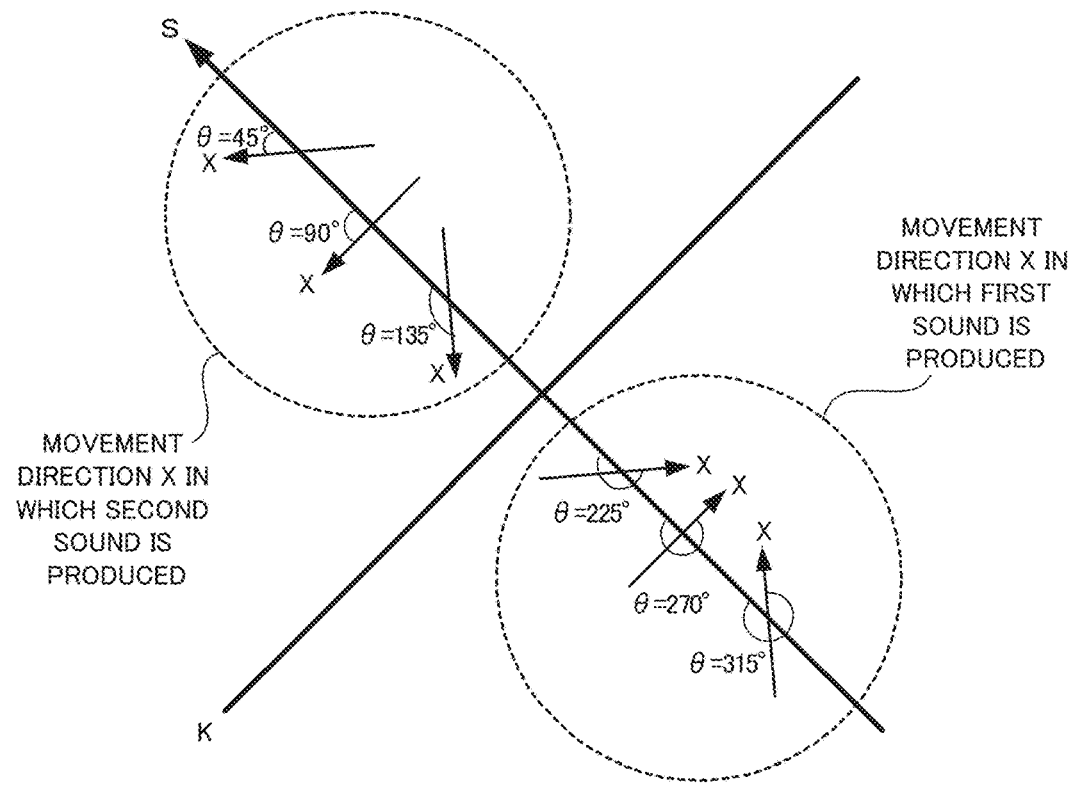
FIG. 14 is a diagram for illustrating a movement angle of a touch pen on the display and the touch panel of FIG. 13.

Here, as shown in FIG. 14, the direction in which the reference line S extends is a direction from the bottom right to the top left, and this direction is called "reference line direction S" (first direction). Also, the angle formed by the movement direction X with respect to the reference line direction S is called "movement angle θ". The movement angle θ is defined in a range of 0 to 360 degrees, as shown in FIG. 14. Also, in addition to the movement direction X, the movement direction calculation unit 813 also calculates the movement velocity V of the pen tip between the first input coordinate L1 and the second coordinate L2.

Next, the sound generation unit 814 will be described. In the present embodiment, the sound generation unit 814 generates three types of audio data (sound information) for outputting a virtual writing sound. Here, for the sake of convenience in the description, the three types of audio data will be called "first to third audio data", and the sounds output from the speakers 88 due to the first to third audio data being input to the codec circuit 87 will be called "first to third sounds". As shown in FIG. 14, the first sound is a sound that is output when the pen tip moves from the left side to the right side of the reference line S. That is, the first sound is a sound that is output when the movement angle θ is 180 to 360 degrees. The second sound is a sound that is output when the pen tip moves from the right side to the left side of the reference line S. In other words, the second sound is a sound that is output when the movement angle θ is 0 to 180 degrees. Also, the third sound is a sound that is output regardless of the movement angle θ.

Figure 15:
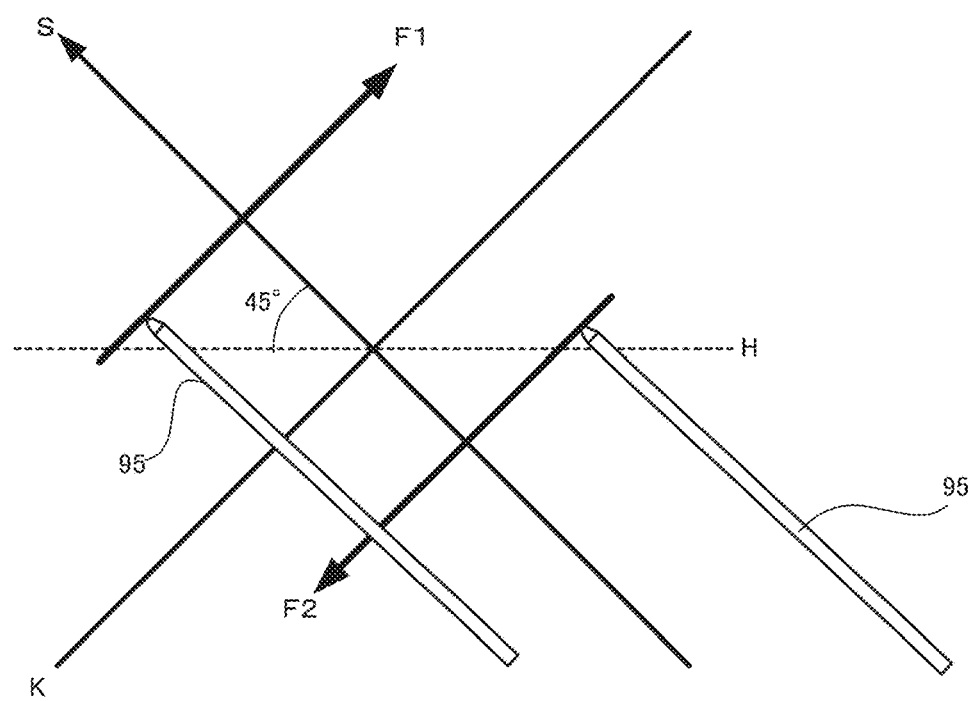
FIG. 15 is a diagram for illustrating a sound produced by writing with a pencil.

For example, when writing is performed with a pencil on paper, as shown in FIG. 15, the writing sound is different depending on whether a pencil 95 is moved in the direction in which the pencil 95 extends, that is from the left side to the right side of the reference line S (arrow F1) or the pencil 95 is moved from the right side to the left side of the reference line S (arrow F2). This is based on the direction of the movement of the lead of the pencil, the friction between the pencil and the paper, how the right-handed user applies force when writing, and the like. Based on this difference in sound, the first sound imitates the sound produced when the pencil is moved from left to right, and the second sound imitates the sound produced when the pencil is moved from right to left. Accordingly, the first sound and the second sound are sounds with different tones.

Also, the third sound (base sound) is a sound with a tone different from those of the first sound and the second sound, but is a sound that is similar to the first sound and the second sound.

Figure 16A:
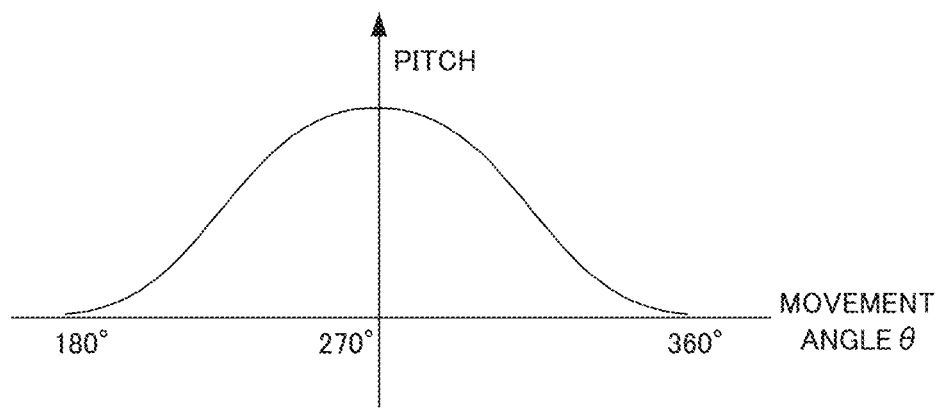
FIG. 16A is a graph showing a relationship between the movement angle of the touch pen and the pitch of a first sound.
Figure 16B:
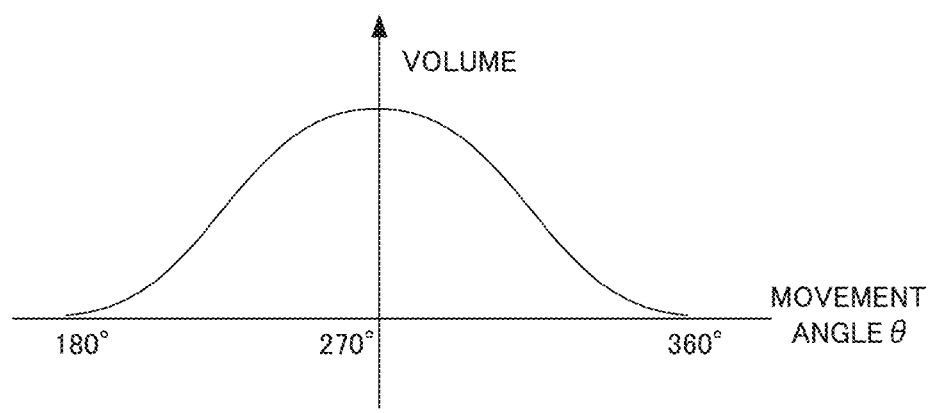
FIG. 16B is a graph showing a relationship between the movement angle of the touch pen and the volume of the first sound.
Figure 16C:
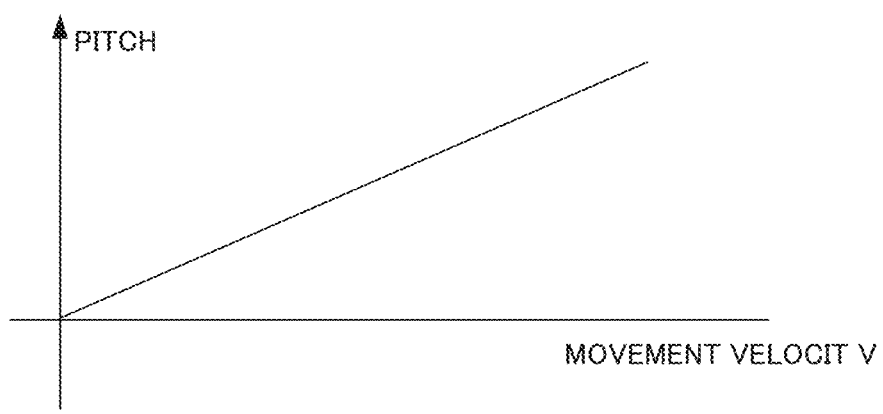
FIG. 16C is a graph showing a relationship between the movement speed of the touch pen and the pitch of the first sound.
Figure 16D:
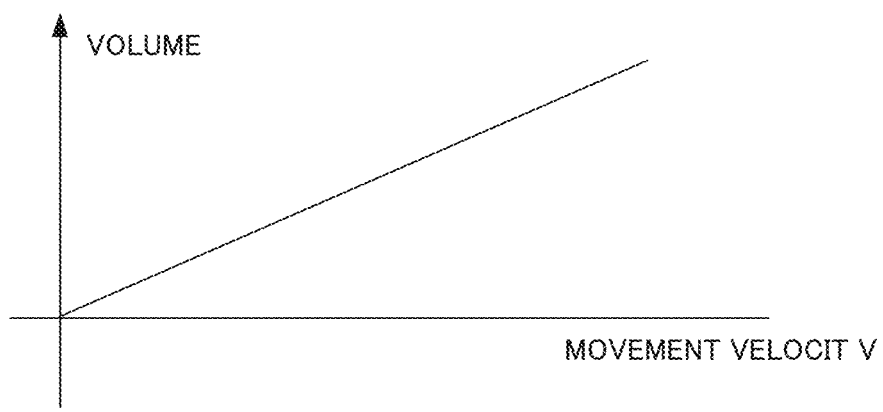
FIG. 16D is a graph showing a relationship between the movement speed of the touch pen and the volume of the first sound.

Next, generation of audio data will be described. First, although the first sound is a sound that is output when the movement angle θ is in the range of 180 to 360 degrees, as shown in FIGS. 16A and 16B, the first sound is set such that the closer the movement angle θ is to 270 degrees (perpendicular), the higher the pitch is, and the greater the volume is. This is because in actual writing, the closer the movement angle θ is to 270 degrees (perpendicular), the greater the contact area between the pen tip and the paper is, and thus the pitch of the writing sound tends to be higher and the volume tends to be greater, and the first sound imitates this. Furthermore, as shown in FIGS. 16C and 16D, the first sound is set such that the faster the movement velocity V of the pen tip is, the higher the pitch is, and the greater the volume is. This is because in actual writing, the greater the movement velocity V is, the more significantly the pitch of the writing sound and the volume of the writing sound tend to change, and the first sound imitates this. The first audio data is generated based on the above settings. Note that the pitch and the volume are set based on the movement angle θ and the movement velocity V, but the pitch and the volume can be determined based on a value obtained by adding weights to the movement angle θ and the movement velocity V and finding their weighted average. For example, the weight of the movement angle θ can be made greater than that of the movement velocity V. Accordingly, it is possible to perform control such that the pitch and the volume do not change much due to changes in the velocity V, but the pitch and the volume change significantly when the movement angle θ changes. The second sound, which will be described next, is similar in this regard. Also, as shown in FIG. 16B, the volume is 0 when the movement angle θ is 180 degrees and when the movement angle θ is 360 degrees, and therefore the first sound is not output, regardless of the movement velocity V.

Figure 17A:
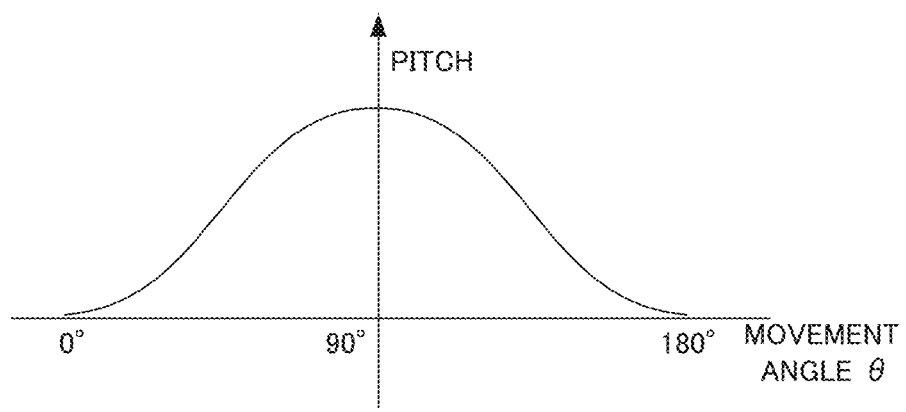
FIG. 17A is a graph showing a relationship between the movement angle of the touch pen and the pitch of a second sound.
Figure 17B:
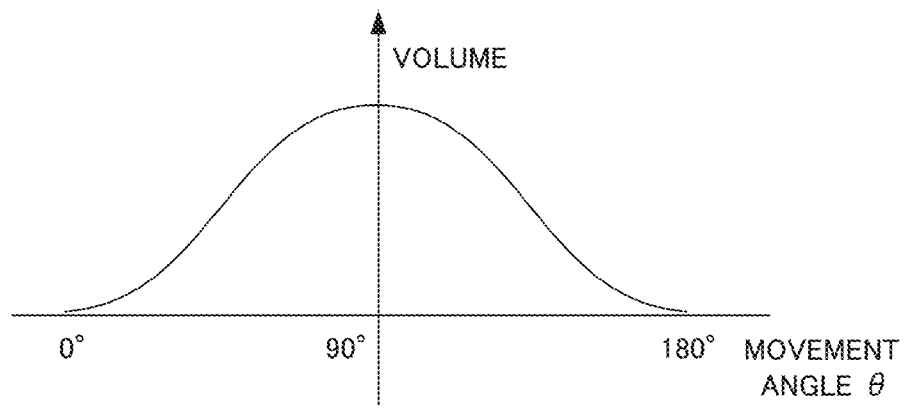
FIG. 17B is a graph showing a relationship between the movement angle of the touch pen and the volume of the second sound.

On the other hand, although the second sound is a sound that is output when the movement angle θ is in the range of 0 to 180 degrees, as shown in FIGS. 17A and 17B, the second sound is set such that the closer the movement angle is to 90 degrees (vertical), the higher the pitch is and the greater the volume is. Furthermore, as shown in FIGS. 16C and 16D, the second sound is set such that the faster the movement velocity V of the pen tip is, the higher the pitch is, and the greater the volume is. The second audio data is generated based on the above settings. Note that as shown in FIG. 17B, when the movement angle θ is 0 degrees and when the movement angle θ is 180 degrees, the volume is 0, and therefore the second sound is not output, regardless of the movement velocity V.

Also, although the third sound is a sound that is output regardless of the movement angle θ, as shown in FIGS. 16C and 16D, the third sound is set such that the faster the movement velocity V of the pen tip is, the higher the pitch is and the higher the volume is. The third audio data is generated based on the above settings.

Figure 18:
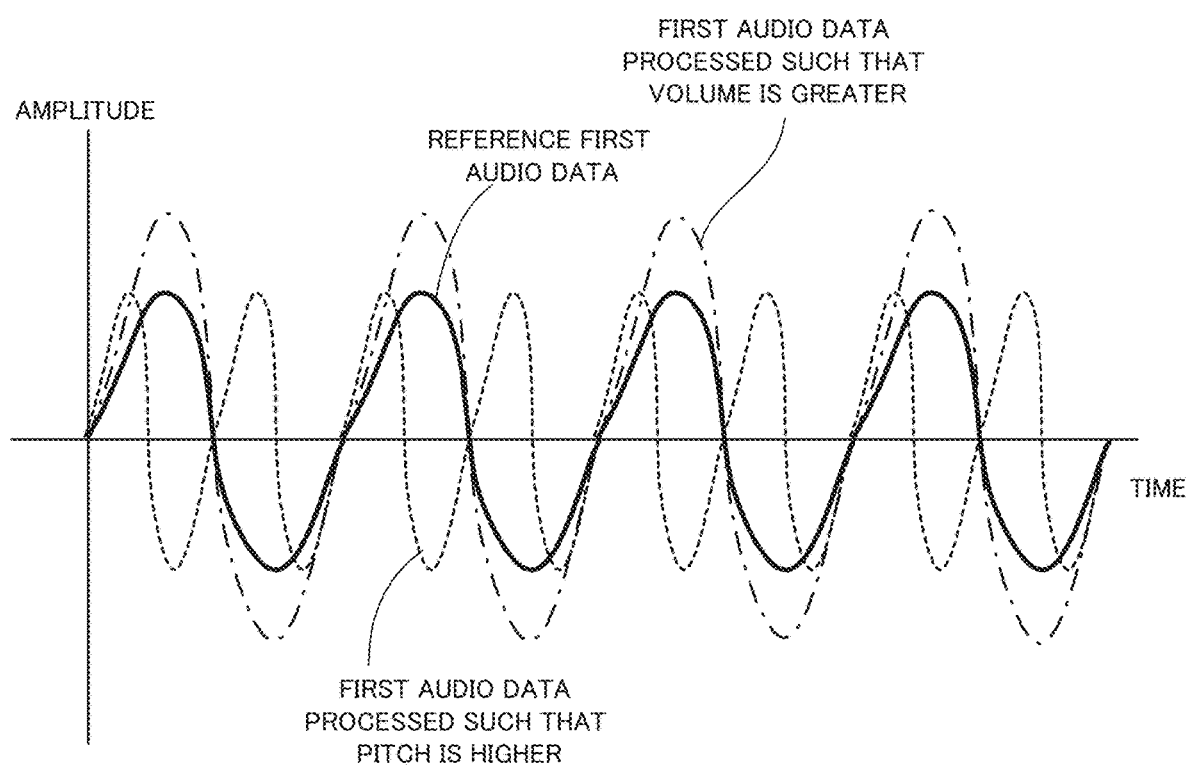
FIG. 18 is a diagram showing an example of processing of audio data.

The first to third audio data is generated by processing reference first to third audio data, which serves as a reference. The reference first to third audio data is stored in the flash memory 84 or an external storage medium, and is processed after being loaded to the DRAM 85. For example, the first audio data is generated by processing the reference first audio data based on the movement angle θ and the movement velocity V of the pen tip, which are calculated by the movement direction calculation unit 813. For example, as shown in FIG. 18, when the pitch is to be raised, the waveform of the reference first audio data is processed such that the frequency increases, and when the volume is to be raised, the waveform of the reference first audio data is processed such that the amplitude increases.

The second audio data is also generated similarly to the first audio data. The difference is that the data serving as the reference is the reference second audio data, and the waveform of the reference second audio data is processed to change the pitch or the volume.

Unlike the first and second audio data, the third audio data is generated based on only the movement velocity V. That is, the waveform of the reference third audio data serving as the reference is processed based on the movement velocity V of the pen tip. That is, the waveform of the reference third audio data is processed to change the pitch and the volume based on the movement velocity V.

As described above, the first to third audio data is sequentially generated accompanying the movement of the pen tip of the touch pen 95, and the virtual writing sound is output from the speakers 88 based on these pieces of audio data. To give a more detailed description, the first audio data is generated when the movement angle of the pen tip is in the range of 180 to 360 degrees, and therefore in this range, a virtual writing sound obtained by overlaying the first sound and the third sound is output from the speakers 88. On the other hand, the second audio data is generated when the movement angle of the pen tip is in the range of 0 to 180 degrees, and therefore in this range, a virtual writing sound obtained by overlaying the second sound and the third sound is output from the speakers. Note that the third sound is output from the speakers 88 as long as the movement velocity is not 0.

Figure 19:
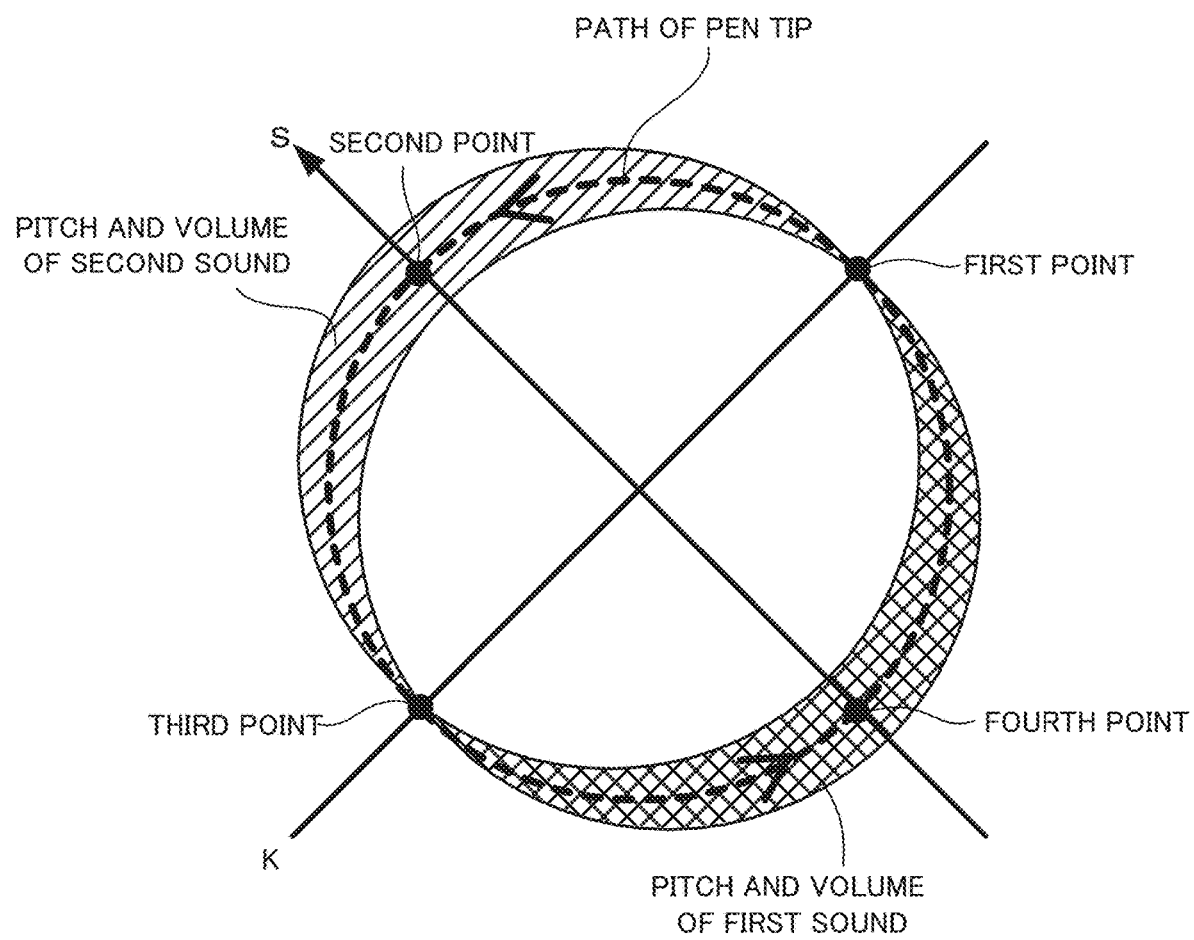
FIG. 19 is a diagram for illustrating the pitch and volume obtained when drawing a circle with the touch pen.

FIG. 19 is a diagram for illustrating control of the pitches and volumes of the first sound and the second sound when a circle is drawn on the touch panel 13. In the example shown in FIG. 19, it is assumed that a circle is drawn by starting writing counterclockwise from point 1, passing through a second point, a third point, and a fourth point along the circle, and returning to the first point. Also, the width of the hatching in FIG. 19 indicates the pitch and the volume, and the greater the width is, the higher the pitch is and the greater the volume is. Note that in this example, the movement velocity V of the pen tip is assumed to be constant.

First, in the path along the first point to the second point, the movement angle θ of the pen tip gradually increases from 0 to 90 degrees. For this reason, in this region, the pitch and the volume of the second sound gradually increase and reach their maximums at the second point. Then, from the second point to the third point, the movement angle θ of the pen tip gradually increases from 90 to 180 degrees. For this reason, in this region, the pitch and the volume of the second sound gradually decrease and reach their minimums at the third point. In this manner, from the first point to the third point, the pitch and the volume of the second sound are controlled, and the first sound is not output.

Next, from the third point to the fourth point, the movement angle θ of the pen tip gradually increases from 180 to 270 degrees. For this reason, in this region, the pitch and the volume of the first sound gradually increase and reach their maximums at the fourth point. Then, from the fourth point to the first point, the movement angle θ of the pen tip gradually increases from 270 to 360 degrees. For this reason, in this region, the pitch and the volume of the first sound gradually decrease and reach their minimums at the first point. In this manner, from the third point to the first point, the pitch and the volume of the first sound are controlled, and the second sound is not output. Note that the first sound or the second sound not being output also includes a case in which the first sound or the second sound is reproduced with a volume of 0.

Note that while the circle is being drawn, the movement speed of the pen tip is not 0, and therefore the third sound is always output while overlaid on the first sound or the second sound.

Figure 20:
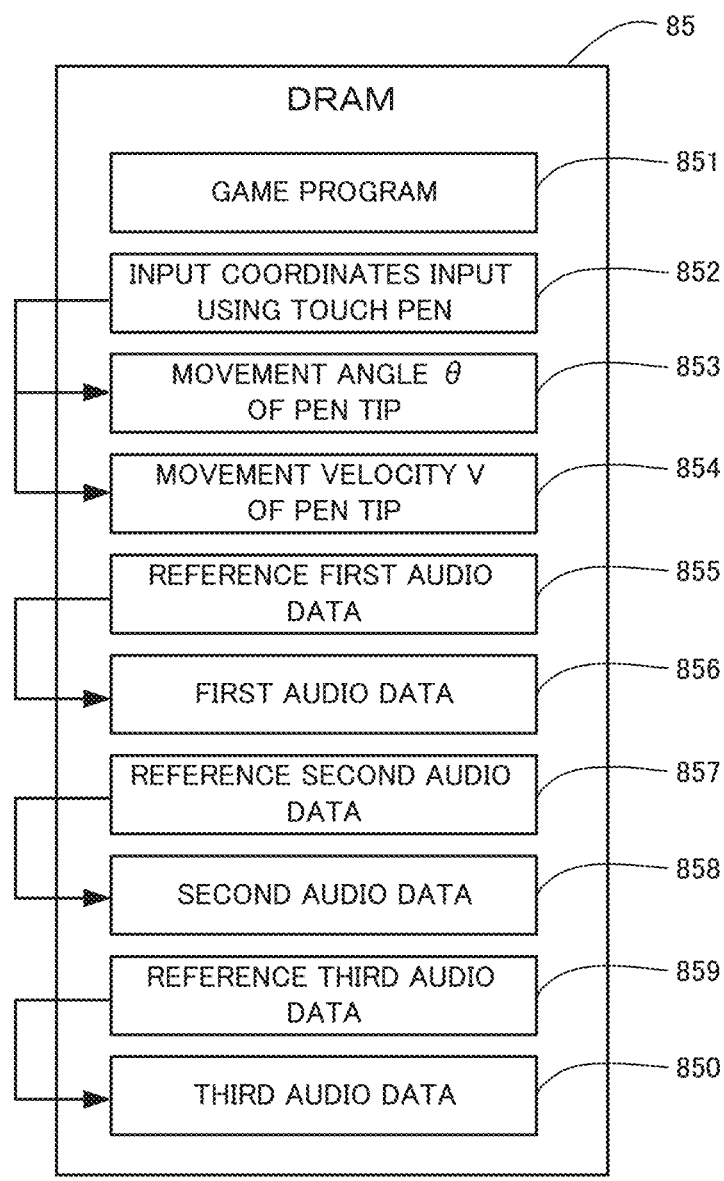
FIG. 20 is an example of data stored in a DRAM.

Next, an example of data stored in the DRAM 85 will be shown in FIG. 20. As shown in FIG. 20, a game program 851 and input coordinates 852 touched by the touch pen are sequentially stored in the DRAM 85. Also, the movement angle 853 of the pen tip and the movement velocity 854 of the pen tip calculated based on the input coordinates are also stored. Furthermore, as described above, the reference first to third audio data 855, 857, and 859 loaded from the flash memory 84 or the external storage medium is stored, and furthermore, the first to third audio data 856, 858, and 850 generated based on the reference first to third audio data 855, 857, and 859 is stored.

The game program 851 is a program for performing the game of the present embodiment, and is stored in advance in a flash memory 84 or an external storage medium. The game program 851 is loaded to the DRAM 85 when the game is started.

In addition, data relating to objects that are needed to progress in the game is also loaded to the DRAM 85 and executed as needed, although this is not shown in the drawings.

4. Example of Game Processing

Figure 21:
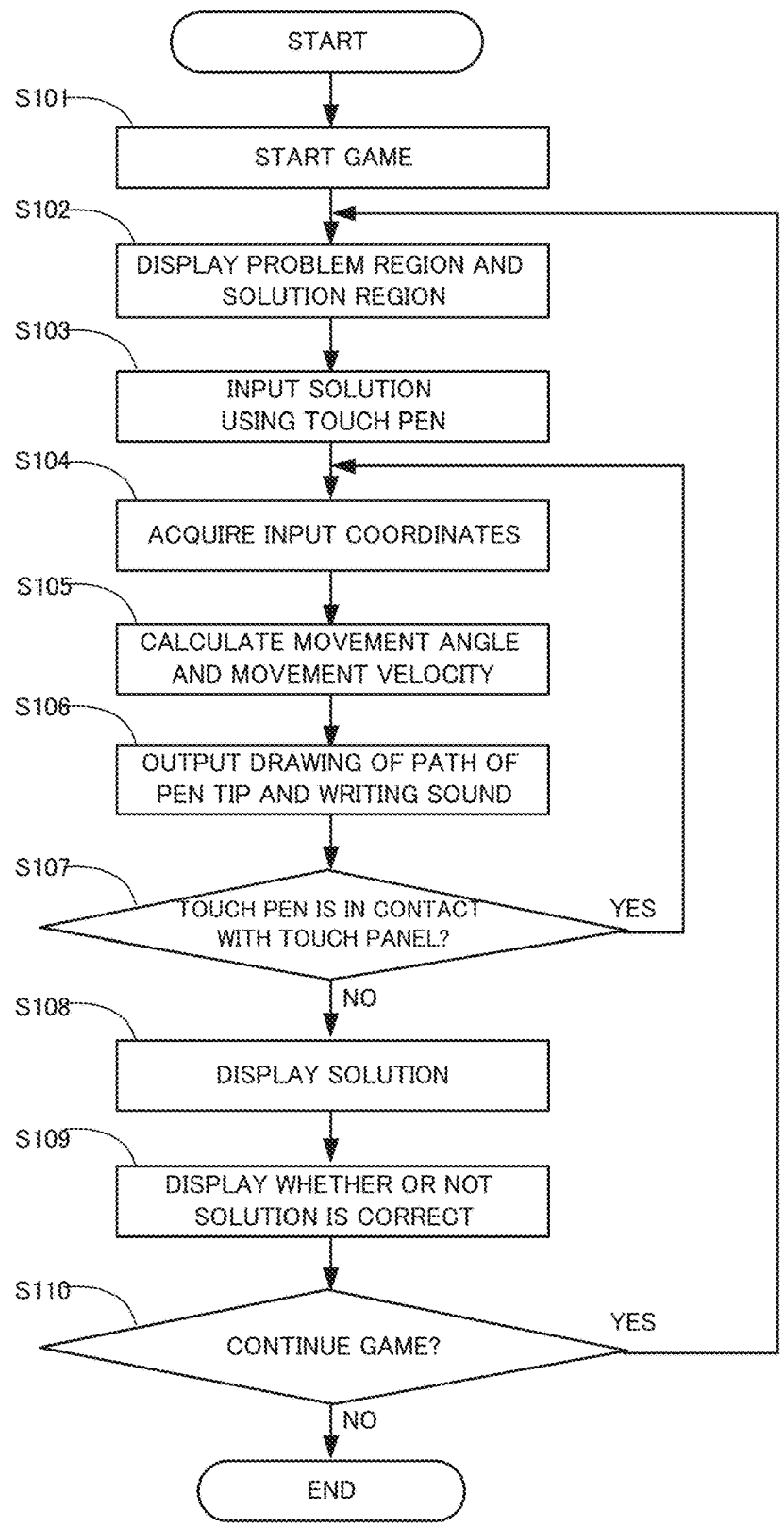
FIG. 21 is a flowchart showing an example of game processing.

Next, an example of game processing will be described with reference to FIG. 21. FIG. 21 is a flowchart indicating an example of game processing. First, the game program 851 is loaded to the DRAM 85, and when the game is started (step S101), the problem region 121 and the solution region 122 are displayed on the display 12 as shown in FIG. 8 (step S102). Next, the user inputs a number serving as the solution to a problem displayed in the problem region 121 in the input space 124 of the solution region 122 using the touch pen 95 (step S103). Then, while the pen tip of the touch pen 95 is moving continuously on the touch panel 13, the input coordinate acquisition unit 811 sequentially acquires the input coordinates of the pen tip (step S104) and stores them in the DRAM 85. Also, the movement direction calculation unit 813 sequentially calculates the movement angle θ and the movement velocity V based on the acquired input coordinates (step S105), and stores them in the DRAM 85. Accompanying this, the drawing information generation unit 812 displays dots at the positions on the display 12 corresponding to the input coordinates. Since the input coordinates are acquired sequentially, the path of the pen tip is drawn as a line on the display 12 due to the dots also being displayed continuously. Also, together with the drawing, the sound generation unit 814 generates the first to third audio data through the above-described processing, and based on this, the writing sound is output from the speakers 88 (step S106).

Then, when the input of the number that is the solution ends, the pen tip of the touch pen 95 is removed from the touch panel 13, and a predetermined amount of time elapses (NO in step S107), the solution is displayed at a predetermined position of the problem region 121 (step S108), and whether or not the solution is correct is displayed (step S109). Thus, if the game is to be continued after all of the problems displayed in the problem region 121 are solved and it is displayed whether or not the solutions are correct (YES in step S110), new problems are displayed in the problem region 121 (step S102). On the other hand, if the game is not to be continued (NO in step S110), the game ends.

5. Characteristics

According to the game system of the present embodiment, the following effects can be obtained.

(1) When the user inputs a character, an image, or the like on the touch panel 13 using the touch pen 95, a changed virtual writing sound is generated as audio data based on the movement angle θ of input. As described above, when the user uses a pencil to write a character or the like on paper, the writing sound is not constant, but changes according to the movement direction of the pencil. In view of this, in the present embodiment, audio data that imitates sound that changes according to the direction of writing is generated and a virtual writing sound is output based on the generated audio data. Therefore, it is possible to improve the feeling that the user is actually writing when the user inputs a character using the touch pen 95. Furthermore, for example, even if pen input is performed with eyes closed, the user can recognize the shape of the writing to a certain degree through sound based on changes in the virtual writing sound.

(2) In the present embodiment, two types of audio data, that is, the first audio data and the second audio data, are generated according to the movement direction of the touch pen 95. The first sound and the second sound, which are generated based on these two pieces of audio data, are output based on the movement angle θ of the pen tip, and therefore, for example, when the movement direction θ of the pen tip changes from the range of movement angles for the first sound (180 to 360 degrees) to the range of movement angles for the second sound (0 to 180 degrees), there are times when both the first sound and the second sound are not output. In view of this, in the present embodiment, the third sound, which is controlled only according to the movement speed V, is output regardless of the movement angle θ of the pen tip. Accordingly, even at a time when both the first sound and the second sound are not output as described above, a virtual writing sound based on the third sound is output, and therefore it is possible to eliminate a feeling of strangeness felt by the user.

6. Modified Examples

Although an embodiment of the present invention was described above, the present invention is not limited to the above-described embodiment, and various modifications are possible without departing from the gist of the present invention. For example, the following modifications are possible. Also, the following modified examples can be combined as appropriate.

(1) In the above-described embodiment, both the pitch and the volume of the virtual writing sound are changed according to the movement angle θ of the pen tip, but it is also possible to change one of the pitch and the volume. For example, it is also possible to prevent the pitches of the first sound and the second sound from changing when the movement angle θ of the pen tip changes. By doing so, the pitches of the first sound and second sound will be based on only the movement velocity V, and therefore the changes to the pitch caused by the movement angle θ and the movement speed V will no longer cancel each other out, and it will be easier to improve the naturalness of the pitches of the first sound and the second sound.

(2) In the above-described embodiment, the closer the movement direction X of the pen tip with respect to the reference line direction S, that is, the movement angle θ, is to 90 degrees or 270 degrees, the higher the pitch is and the greater the volume is. That is, when the movement direction X is close to being perpendicular with respect to the reference line direction S, the pitch is higher and the volume is greater than the pitch and the volume achieved when the movement direction X is close to being parallel to the reference line direction S. However, this is an example, and the relationship between the movement angle θ and the pitch and volume can be set as appropriate. For example, it is possible to make the pitch rise at an angle that is not perpendicular, or to provide multiple predetermined angles at which the pitch rises.

(3) In the above-described embodiment, depending on the movement angle θ, there is a range of movement angles θ at which the first sound is output and a range of movement angles θ at which the second sound is output, and for example, at a movement angle θ at which the first sound is output, the second sound is not output. However, it is also possible to output both sounds depending on the movement angle. For example, in the example shown in FIG. 19, both sounds may also be output near the first point and near the third point, at which the ranges of the movement angles θ of the sounds transition.

(4) In the above-described embodiment, a configuration was used in which a first sound and a second sound with different tones are output, but the output sounds may also have one or three or more tones. For example, if there is one tone, it is sufficient that the pitch and the volume of the sound is changed according to the movement angle θ. Also, if sounds with three or more tones are set, three or more ranges of movement angles may be set, and in each range, the sound that is output may be set individually.

(5) In the above-described embodiment, the reference line S is set so as to extend from the bottom right to the top left, envisioning a right-handed user, but if a left-handed user is envisioned, the intersecting line K serves as the reference line. Accordingly, before starting the game, the user can input whether the user is right-handed or left-handed, and the reference line can be set according to the user's setting.

(6) The reference line direction (first direction) need not be a direction that is inclined by an approximately 45-degree angle with respect to the coordinate axis in the coordinate plane of the orthogonal coordinate system, and a direction that is inclined by another angle can be set as appropriate. Alternatively, the reference line direction can also be set so as to extend parallel to any coordinate axis. Accordingly, the "movement direction" according to the present invention can be a direction with respect to the reference line direction that has been set as appropriate.

(7) In the above-described embodiment, a third sound is included in the virtual writing sound, but since the third sound is a sound overlaid on the first sound and the second sound, it is preferable that the tone of the third sound is similar to those of the first sound and the second sound. However, there is no limitation to this, and the third sound can be set as appropriate according to the case in which it is applied. Note that the third sound is not necessarily needed, and it is also possible to use only sounds such as the first sound and the second sound, which change according to the movement angle θ.

(8) In the above-described embodiment, when the audio data is generated, the pitches and the volumes are determined based on the movement angle θ and the movement velocity V. For example, the method of generating the audio data shown in FIGS. 16 and 17 is an example, and the audio data can be generated in accordance with another rule. For example, the movement angles and the movement speeds at which the pitches and the volumes reach their minimums and maximums can be set as appropriate. Also, the movement velocity is not necessarily needed in the determination of the pitch and the volume, and the pitch and the volume can also be determined according to only the movement angle θ.

(9) In the above-described embodiment, the input coordinates are acquired at a predetermined period and the movement angle θ and the movement velocity V are calculated based on adjacent input coordinates L1 and L2, but there is no limitation to this. That is, there is no limitation to adjacent input coordinates, and the movement angle θ and the movement velocity V may be calculated based on a change in multiple input coordinates that are defined as appropriate.

(10) In the above-described embodiment, taking the reference audio data as a base, audio data (sound information) with different pitches and volumes are generated based on the movement angle θ and the movement velocity V, but the method of generating the audio data is not limited thereto, and various methods can be used. For example, audio data corresponding to the movement angle and the movement velocity can be generated each time without using the reference audio data. Alternatively, audio data corresponding to a predetermined movement angle and a movement velocity can also be created in advance and the sound can be output based on the created audio data.

(11) In the above-described embodiment, a virtual writing sound that imitates a writing sound that is produced when writing on paper with a pencil is set, but there is no limitation to this. That is, the virtual writing sound can be a sound that imitates a writing sound that is produced when writing is performed on various targets, such as paper, plastic, or metal, with various writing tools, such as a pencil, a pen, or a fountain pen.

(12) In the above-described embodiment, an example of a case in which input is performed using a touch pen was described, but the present invention can be applied also when performing input with a finger instead of the touch pen, or when performing input through gesture input using a mouse or a remote control.

(13) In the above-described embodiment, the present invention was applied to input of a character in a game, but the present invention can be applied in applications other than games, and can be applied to an apparatus for simply performing input of a character and drawing the input.

(14) In the above-described embodiment, the game system corresponding to the information processing apparatus of the present invention includes a display 12, a touch panel 13, and speakers 88, but there is no limitation to this. That is, the information processing apparatus according to the present invention need not include a display, a touch panel, and speakers, and the above-described processing can also be performed by connecting external display, touch panel, and speakers to the information processing apparatus according to the present invention.

(15) The storage medium, information processing program stored in the storage medium, the information processing apparatus, and the information processing method of the present disclosure can be applied also to play for multiple people via a network such as a LAN or the Internet, which is connected to with a wire or wirelessly.

DESCRIPTION I/F REFERENCE NUMERALS

1 Game system (information processing apparatus)
12 Display (display apparatus)
13 Touch panel
811 Input coordinate acquisition unit
812 Drawing information generation unit
813 Movement direction calculation unit
814 Sound generation unit

What is claimed is:

1. A non-transitory storage medium storing therein a program that is readable by a computer of an information processing apparatus, the program being configured to cause the computer to:
acquire input coordinates of input performed based on an operation by a user, the input coordinates are set in a coordinate plane of an orthogonal coordinate system;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing, where the virtual writing sound is changed according to the movement direction with respect to a reference line, the direction of the reference line is inclined with respect to a coordinate axis of the coordinate plane; and
output the sound information of the virtual writing sound to a speaker.

2. The storage medium according to claim 1, wherein the program is further configured to cause the computer to generate the sound information where a volume of the virtual writing sound is changed according to the movement direction with respect to the reference line.

3. The storage medium according to claim 2, wherein the program is further configured to cause the computer to generate the sound information where when the movement direction is close to being perpendicular to the reference line, the volume is greater compared to a case where the movement direction is close to being parallel to the reference line.

4. The storage medium according to claim 1, wherein the program is further configured to cause the computer to generate the sound information where a pitch of the virtual writing sound is changed according to the movement direction with respect to the reference line.

5. The storage medium according to claim 4, wherein the program is further configured to cause the computer to generate the sound information where when the movement direction is close to being perpendicular to the reference line, the pitch is higher compared to a case where the movement direction is close to being parallel to the reference line.

6. The storage medium according to claim 1, wherein the program is further configured to cause the computer to generate the sound information where a tone of the virtual writing sound is changed according to the movement direction with respect to the reference line.

7. The storage medium according to claim 6, wherein the program is further configured to cause the computer to generate the sound information where the tone is changed depending on whether an angle formed by the movement direction with respect to the direction of the reference line is greater than or equal to 0 degrees and less than 180 degrees or greater than or equal to 180 degrees and less than 360 degrees.

8. The storage medium according to claim 1, wherein the reference line is inclined by about 45 degrees with respect to the coordinate axis.

9. The storage medium according to claim 1, wherein the program is further configured to cause the computer to determine an input velocity based on a change in the input coordinates and change the sound information of the virtual writing sound according to the determined input velocity.

10. The storage medium according to claim 9, wherein the program is further configured to cause the computer to generate the sound information where the change in the sound information of the virtual writing sound is greater when the determined input velocity is faster.

11. The storage medium according to claim 9, wherein the program is further configured to cause the computer to generate the sound information of the virtual writing sound where virtual writing sound has a higher pitch when the determined input velocity is faster.

12. An information processing apparatus comprising:
at least one processor;
at least one storage medium;
a program stored in the storage medium;
wherein the program is configured to cause the at least one processor to:
acquire input coordinates of input performed based on an operation by a user, the input coordinates are set in a coordinate plane of an orthogonal coordinate system;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing, where the virtual writing sound is changed according to the movement direction with respect to a reference line, the direction of the reference line is inclined with respect to a coordinate axis of the coordinate plane ; and
output the sound information of the virtual writing sound to a speaker.

13. An information processing method comprising:
acquiring input coordinates of input performed based on an operation of a user, the input coordinates are set in a coordinate plane of an orthogonal coordinate system;
generating drawing information for displaying a path corresponding to the input coordinates on a display apparatus;
determining a movement direction of the input based on a change in the input coordinates, which are acquired continuously while the input is performed; and
generating sound information of a virtual writing sound that is changed based on the movement direction in response to the input coordinates changing, where the virtual writing sound is changed according to the movement direction with respect to a reference line, the direction of the reference line is inclined with respect to a coordinate axis of the coordinate plane; and
outputting the sound information of the virtual writing sound to a speaker.

14. A game system comprising:
at least one processor;
at least one storage medium;
a program stored in the storage medium;
wherein the program is configured to cause the at least one processor to:
acquire input coordinates of input performed based on an operation by a user, the input coordinates are set in a coordinate plane of an orthogonal coordinate system;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing, where the virtual writing sound is changed according to the movement direction with respect to a reference line, the direction of the reference line is inclined with respect to a coordinate axis of the coordinate plane; and
output the sound information of the virtual writing sound to a speaker.

15. A mobile device comprising:
a display comprising a touch panel;
at least one speaker; and
a processor configured to:
acquire input coordinates of input performed on the touch panel, the input coordinates are set in a coordinate plane of an orthogonal coordinate system;
generate drawing information for displaying a path corresponding to the input coordinates in the display;
determine a movement direction of the input based on a change in the input coordinates, which are acquired continuously while the input is performed;
generate sound information of a virtual writing sound that is changed based on the movement direction in response to the input coordinates changing, where the virtual writing sound is changed according to the movement direction with respect to a reference line, the direction of the reference line is inclined with respect to a coordinate axis of the coordinate plane; and output the sound information of the virtual writing sound to the at least one speaker.

16. A non-transitory storage medium storing therein a program that is readable by a computer of an information processing apparatus, the program being configured to cause the computer to:
acquire input coordinates of input performed based on an operation by a user;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing, where the virtual writing sound is changed according to the movement direction with respect to a reference line, where a direction of the reference line is changed depending on whether the user is set as being right-handed or is set as being left-handed; and
output the sound information of the virtual writing sound to a speaker.

17. A non-transitory storage medium storing therein a program that is readable by a computer of an information processing apparatus, the program being configured to cause the computer to:
acquire input coordinates of input performed based on an operation by a user;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing; and
output the sound information of the virtual writing sound to a speaker,
wherein the sound information includes a base sound that does not change according to the movement direction.

18. An information processing apparatus comprising:
at least one processor;
at least one storage medium;
a program stored in the storage medium;
wherein the program is configured to cause the at least one processor to:
acquire input coordinates of input performed based on an operation by a user;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing, where the virtual writing sound is changed according to the movement direction with respect to a reference line, where a direction of the reference line is changed depending on whether the user is set as being right-handed or is set as being left-handed; and
output the sound information of the virtual writing sound to a speaker.

19. An information processing apparatus comprising:
at least one processor;
at least one storage medium;
a program stored in the storage medium;
wherein the program is configured to cause the at least one processor to:
acquire input coordinates of input performed based on an operation by a user;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing, and
output the sound information of the virtual writing sound to a speaker,
wherein the sound information includes a base sound that does not change according to the movement direction.

20. An information processing method comprising:
acquiring input coordinates of input performed based on an operation of a user;
generating drawing information for displaying a path corresponding to the input coordinates on a display apparatus;
determining a movement direction of the input based on a change in the input coordinates, which are acquired continuously while the input is performed;
generating sound information of a virtual writing sound that is changed based on the movement direction in response to the input coordinates changing, where the virtual writing sound is changed according to the movement direction with respect to a reference line, where a direction of the reference line is changed depending on whether the user is set as being right-handed or is set as being left-handed; and
outputting the sound information of the virtual writing sound to a speaker.

21. An information processing method comprising:
acquiring input coordinates of input performed based on an operation of a user;
generating drawing information for displaying a path corresponding to the input coordinates on a display apparatus;
determining a movement direction of the input based on a change in the input coordinates, which are acquired continuously while the input is performed;
generating sound information of a virtual writing sound that is changed based on the movement direction in response to the input coordinates changing; and
outputting the sound information of the virtual writing sound to a speaker, wherein the sound information includes a base sound that does not change according to the movement direction.

22. A game system comprising:
at least one processor;
at least one storage medium;
a program stored in the storage medium;
wherein the program is configured to cause the at least one processor to:
acquire input coordinates of input performed based on an operation by a user;
generate drawing information for displaying a path corresponding to the input coordinates on a display apparatus;

determine a movement direction of the input based on a change in the input coordinates, which are acquired continuously while the input is performed;

generate sound information of a virtual writing sound that is changed based on the movement direction in response to the input coordinates changing, where the virtual writing sound is changed according to the movement direction with respect to a reference line, where a direction of the reference line is changed depending on whether the user is set as being right-handed or is set as being left-handed; and output the sound information of the virtual writing sound to a speaker.

23. A game system comprising:
at least one processor;
at least one storage medium;
a program stored in the storage medium;
wherein the program is configured to cause the at least one processor to:
acquire input coordinates of input performed based on an operation by a user;
generate drawing information for displaying a path corresponding to the input coordinates on a display apparatus;
determine a movement direction of the input based on a change in the input coordinates, which are acquired continuously while the input is performed;
generate sound information of a virtual writing sound that is changed based on the movement direction in response to the input coordinates changing; and
output the sound information of the virtual writing sound to a speaker,
wherein the sound information includes a base sound that does not change according to the movement direction.

24. A mobile device comprising:
a display comprising a touch panel;
at least one speaker; and
a processor configured to:
acquire input coordinates of input performed on the touch panel;
generate drawing information for displaying a path corresponding to the input coordinates in the display;
determine a movement direction of the input based on a change in the input coordinates, which are acquired continuously while the input is performed;
generate sound information of a virtual writing sound that is changed based on the movement direction in response to the input coordinates changing, where the virtual writing sound is changed according to the movement direction with respect to a reference line, where a direction of the reference line is changed depending on whether the user is set as being right-handed or is set as being left-handed; and
output the sound information of the virtual writing sound to the at least one speaker.

25. A mobile device comprising:
a display comprising a touch panel;
at least one speaker; and
a processor configured to:
acquire input coordinates of input performed on the touch panel;
generate drawing information for displaying a path corresponding to the input coordinates in the display;
determine a movement direction of the input based on a change in the input coordinates, which are acquired continuously while the input is performed;
generate sound information of a virtual writing sound that is changed based on the movement direction in response to the input coordinates changing; and
output the sound information of the virtual writing sound to the at least one speaker,
wherein the sound information includes a base sound that does not change according to the movement direction.

26. A mobile device comprising:
a display comprising a touch panel;
at least one speaker; and
a processor configured to:
acquire input coordinates of input performed on the touch panel;
generate drawing information for displaying a path corresponding to the input coordinates in the display;
determine a movement direction of the input based on a change in the input coordinates, which are acquired continuously while the input is performed;
generate sound information of a virtual writing sound that is changed based on the movement direction in response to the input coordinates changing; and
output the sound information of the virtual writing sound to the at least one speaker,
wherein the processor is configured to generate a first audio data and a third audio data and combine the first audio data and the third audio data to generate the sound information of the virtual writing sound when the determined direction is a first direction; and
wherein the processor is configured to generate a second audio data and the third audio data and combine the second audio data and the third audio data to generate the sound information of the virtual writing sound when the determined direction is a second direction, the first audio data and the second audio data being different.

* * * * *